United States Patent
Patil et al.

(10) Patent No.: US 12,058,009 B2
(45) Date of Patent: Aug. 6, 2024

(54) INTEGRATION OF A DEVICE PLATFORM WITH A CORE NETWORK OR A MULTI-ACCESS EDGE COMPUTING ENVIRONMENT

(71) Applicant: AT&T Mobility II LLC, Atlanta, GA (US)

(72) Inventors: Basavaraj Patil, Dallas, TX (US); Mobeen Khan, Parker, TX (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 18/165,380

(22) Filed: Feb. 7, 2023

(65) Prior Publication Data
US 2023/0179491 A1 Jun. 8, 2023

Related U.S. Application Data

(63) Continuation of application No. 17/101,862, filed on Nov. 23, 2020, now Pat. No. 11,601,340, which is a (Continued)

(51) Int. Cl.
*H04L 41/16* (2022.01)
*G06N 20/00* (2019.01)
(Continued)

(52) U.S. Cl.
CPC ............ *H04L 41/16* (2013.01); *G06N 20/00* (2019.01); *H04L 41/0806* (2013.01); *H04L 69/18* (2013.01)

(58) Field of Classification Search
CPC ....... H04W 76/12; H04W 24/08; H04W 8/02; H04W 4/70; H04W 88/16; H04L 41/0806;
(Continued)

(56) References Cited

U.S. PATENT DOCUMENTS 8,432,871 B1   4/2013  Sarnaik et al.
9,923,807 B2   3/2018  Kodaypak et al.
(Continued)

FOREIGN PATENT DOCUMENTS

WO   2017128881   8/2017
WO   2017146768   8/2017
(Continued)

OTHER PUBLICATIONS

Non-Final office action received for U.S. Appl. No. 16/412,354 dated May 18, 2020, 17 Pages.
(Continued)

*Primary Examiner* — Chi Ho A Lee

(57) ABSTRACT

Techniques for integrating a device platform in a core network or MEC environment, and managing data communications associated with devices are presented. The device platform, integrated with the core network or MEC environment, can comprise a communication management component (CMC) that can manage communication of data associated with devices connected to the core network. CMC can receive data and metadata from a device, analyze the data and metadata, and, based on the analyzing and data management criteria, determine whether any, all, or a portion of the data is to be communicated to a second device associated with the core network or associated communication network. CMC can be trained, using machine learning, to learn to identify device types, communication protocols, and data payload formats of devices. Based on the analyzing and the training, CMC can determine the device type, communication protocol, and data payload format associated with the device.

20 Claims, 13 Drawing Sheets

Related U.S. Application Data continuation of application No. 16/412,354, filed on May 14, 2019, now Pat. No. 10,887,187.

(51) Int. Cl.
*H04L 41/0806* (2022.01)
*H04L 69/18* (2022.01)

(58) Field of Classification Search
CPC ......... H04L 69/16; H04L 41/16; H04L 67/12; H04L 67/02; H04L 67/10
See application file for complete search history.

(56) References Cited

U.S. PATENT DOCUMENTS

| | | | |
|---|---|---|---|
| 10,064,123 B2 | 8/2018 | Bari | |
| 10,091,100 B1 | 10/2018 | Duerk | |
| 10,193,981 B2 | 1/2019 | Cook | |
| 2008/0261602 A1 | 10/2008 | Livneh | |
| 2008/0291916 A1* | 11/2008 | Xiong | H04L 45/127 370/392 |
| 2010/0054196 A1 | 3/2010 | Hui | |
| 2013/0339529 A1* | 12/2013 | Rizzo | H04L 67/1074 709/226 |
| 2014/0029615 A1* | 1/2014 | Baldwin | H04L 67/5651 370/392 |
| 2014/0064188 A1 | 3/2014 | D'Souza et al. | |
| 2014/0153572 A1 | 6/2014 | Hampel et al. | |
| 2014/0341041 A1 | 11/2014 | Velev et al. | |
| 2015/0072701 A1 | 3/2015 | Watanabe | |
| 2016/0135089 A1* | 5/2016 | Catovic | H04W 36/22 370/331 |
| 2016/0301598 A1 | 10/2016 | Strijkers et al. | |
| 2016/0301762 A1 | 10/2016 | Strijkers et al. | |
| 2017/0006141 A1 | 1/2017 | Bhadra | |
| 2017/0048308 A1 | 2/2017 | Qaisar | |
| 2017/0064037 A1 | 3/2017 | Das et al. | |
| 2017/0257750 A1 | 9/2017 | Gunasekara et al. | |
| 2017/0264702 A1 | 9/2017 | Dao | |
| 2017/0295512 A1 | 10/2017 | Rangaswamy | |
| 2018/0054490 A1 | 2/2018 | Wadhwa et al. | |
| 2018/0131770 A1 | 5/2018 | Doraiswamy et al. | |
| 2018/0159777 A1 | 6/2018 | Ramalho et al. | |
| 2018/0248983 A1 | 8/2018 | Mohebbi et al. | |
| 2018/0295485 A1 | 10/2018 | Jalkanen et al. | |
| 2018/0300124 A1 | 10/2018 | Malladi et al. | |
| 2018/0316928 A1 | 11/2018 | Jain et al. | |
| 2018/0338017 A1 | 11/2018 | Mekuria et al. | |
| 2018/0341528 A1 | 11/2018 | Ovens et al. | |
| 2018/0352038 A1 | 12/2018 | Sathyanarayana et al. | |
| 2018/0367321 A1 | 12/2018 | Stammers et al. | |
| 2018/0367630 A1 | 12/2018 | Wei et al. | |
| 2019/0007984 A1 | 1/2019 | Kuroda et al. | |
| 2019/0014048 A1 | 1/2019 | Krishna Singuru | |
| 2019/0028573 A1 | 1/2019 | Cook et al. | |
| 2019/0246281 A1 | 8/2019 | Ziskind et al. | |
| 2019/0350025 A1 | 11/2019 | Eriksson et al. | |
| 2020/0045714 A1* | 2/2020 | Ohta | H04L 1/1887 |
| 2020/0137620 A1 | 4/2020 | Hsu et al. | |

FOREIGN PATENT DOCUMENTS

| | | |
|---|---|---|
| WO | 2017176877 | 10/2017 |
| WO | 2018026841 | 2/2018 |
| WO | 2018064432 | 4/2018 |
| WO | 2018065632 | 4/2018 |
| WO | 2018175378 | 9/2018 |
| WO | 2018212765 | 11/2018 |

OTHER PUBLICATIONS

Salman, et al. "Edge computing enabling the Internet of Things" Internet of Things (WF-IoT), 2015 IEEE 2nd World Forum, IEEE, 2015. 6 pages.
Rouse, Margaret. "fog computing {fog networking, fogging}" IoT Agenda, internetofthingsagenda.techtarget.com, Apr. 25, 2017. 4 pages.
Non-Final Office Action received for U.S. Appl. No. 17/101,862 dated Jun. 7, 2022, 29 Pages.
Notice of Allowance received for U.S. Appl. No. 16/412,354 dated Oct. 6, 2020, 15 pages.
Notice of Allowance received for U.S. Appl. No. 17/101,862 dated Nov. 4, 2022, 9 pages.
U.S. Appl. No. 16/412,354, filed May 14, 2019.
U.S. Appl. No. 17/101,862, filed Nov. 23, 2020.

* cited by examiner

INTEGRATION OF A DEVICE PLATFORM WITH A CORE NETWORK OR A MULTI-ACCESS EDGE COMPUTING ENVIRONMENT

RELATED APPLICATIONS

The subject patent application is a continuation of, and claims priority to each of, U.S. patent application Ser. No. 17/101,862, filed Nov. 23, 2020, and entitled "INTEGRATION OF A DEVICE PLATFORM WITH A CORE NETWORK OR A MULTI-ACCESS EDGE COMPUTING ENVIRONMENT," which is a continuation of U.S. patent application Ser. No. 16/412,354 (now U.S. Pat. No. 10,887,187), filed May 14, 2019, and entitled "INTEGRATION OF A DEVICE PLATFORM WITH A CORE NETWORK OR A MULTI-ACCESS EDGE COMPUTING ENVIRONMENT," the entireties of which priority applications are hereby incorporated by reference herein.

TECHNICAL FIELD

The subject disclosure relates generally to communications networks, and, for example, to integration of a device platform with a core network or a multi-access edge computing environment.

BACKGROUND

Communication devices can communicate data to other communication devices via a communication network. For example, a wireless phone (e.g., mobile, cell, or smart phone; or electronic tablet or pad) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network. Certain devices, which can be referred to as Internet of Things (IoT) devices, also can connect to the wireless communication network to communicate data to other communication devices, including, for example, devices associated with applications or services. The use of such IoT devices is becoming more prevalent and can be expected to grow rapidly in the next decade, being projected to number in the billions. Unique challenges can exist to provide desirable levels of service to the relatively large number of devices (e.g., mobile, cell, or smart phones; electronic tablet or pad; IoT devices) that can be expected to be connecting to, and communicating data via, wireless communication networks.

The above-described description is merely intended to provide a contextual overview relating to communication networks, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
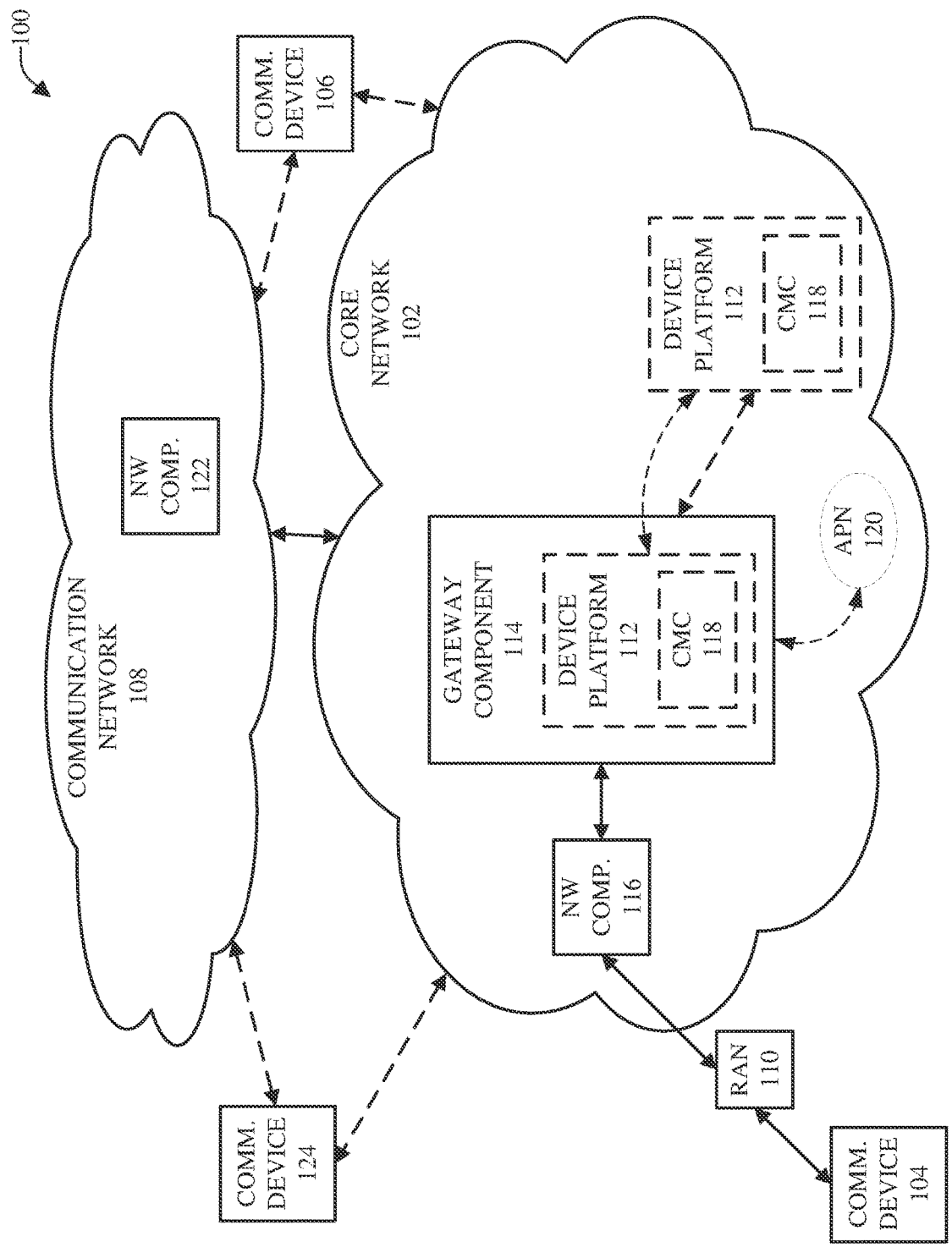
FIG. 1 depicts a block diagram of an example, non-limiting system that can manage communication of data associated with a core network to facilitate desirable and efficient communication of information between devices associated with the core network or an associated communication network, in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to managing communication of data received from devices (e.g., Internet of Things (IoT) devices or other communication devices) associated with (e.g., communicatively connected to) a core network, determining characteristics (e.g., device type, communication protocol, and/or data payload format, . . . ) associated with a device or data received from the device, training a device platform (e.g., training a machine learning and/or artificial intelligence (AI) engine of the device platform), and/or performing other operations (e.g., operations of or associated with the device platform) in connection with managing the communication of data received from the devices associated with the core network. The disclosed subject matter can significantly improve data communications, processing of data, and network efficiency associated with core networks.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can be a multiple with a factor of $N_t$ over single antenna systems in a rich scattering environment.

Communication devices can communicate data to other communication devices via a communication network. For example, a wireless phone (e.g., mobile, cell, or smart phone; or electronic tablet or pad) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network. Certain devices, which can be referred to as IoT devices (e.g., music players and/or speakers; machine-to-machine (M2M) devices; smart meters, such as a smart utility meter; devices and/or sensors that can monitor or sense conditions, such as health-related devices or sensors; drones; . . . ), also can connect to the wireless communication network to communicate data to other communication devices, including, for example, devices associated with applications or services. The use of such IoT devices is becoming more prevalent and can be expected to grow rapidly in the next decade, being projected to number in the billions or even tens of billions. Unique challenges can exist to provide desirable levels of service to the relatively large number of devices (e.g., mobile, cell, or smart phones; electronic tablet or pad; IoT devices) that can be expected to be connecting to, and communicating data via, wireless communication networks.

As the number of devices increases, the amount of data (e.g., user data, telemetry data, and/or other data) being transmitted via communication networks, including wireless communication networks, can increase as well. Routing data from certain devices, such as IoT devices, to a centralized location, such as the cloud environment or a data center, can be undesirably expensive and suboptimal. For instance, a traditional IoT ecosystem can utilized a centralized IoT platform within a cloud environment to which devices (e.g., IoT devices) can send data. The data typically can traverse the wireless communication network (e.g., core or cellular network) to another communication network (e.g., IP-based communication network, such as the Internet) or some other dedicated communication network before it reaches the centralized IoT platform in the cloud. As the number of devices in use grows (e.g., to billions or tens of billions of IoT devices), the amount of data that can be sent to the centralized IoT platform in the cloud can increase rapidly. When data is sent over a communication network, such as the Internet, there can be network congestion or other routing issues that can undesirably increase latency in data communications in the communication network. The latency issue can have impacts (e.g., negative impacts, such as negative performance impacts, negative outcome impacts, . . . ) on applications, particularly application that can be time sensitive (e.g., applications that are performing time-sensitive operations or providing time-sensitive services). Further, a significant amount of the data that can be generated and communicated by devices, such as IoT devices, can be repetitive, not relevant, unnecessary, or undesirable from the perspective of the intended recipient (e.g., communication device associated with an application, service, and/or entity).

To that end, the disclosed subject matter presents techniques, methods, and systems that can integrate a device platform in a core network or a multi-access edge computing (MEC) environment and, utilizing the device platform, can manage communication of data associated with devices. The devices can comprise, for example, IoT devices or other types of communication devices. The device platform (e.g., IoT platform), which can be integrated with the core network, can be associated with (e.g., co-located with or part of; or in proximity to and communicatively connected to) a gateway component of the core network. The device platform can act as an end point for devices to send data (e.g., data intended to be sent to other devices), as an integral part of the core network (e.g., part of the cellular packet core network). The device platform can be and/or can act as an edge computing element for devices (e.g., IoT devices) and data. The device platform can move the processing of data received from devices associated with (e.g., communicatively connected to) the core network closer (e.g., physically and/or logically closer) to such devices. That is, the device platform can push the edge closer to such devices, as the edge can be the core network itself (e.g., the device platform in the core network).

The device platform can comprise a communication management component (CMC) that can manage communication of data associated with devices connected to the core network. In some embodiments, the CMC can be trained, using a desired machine learning or artificial intelligence (AI) technology, to learn to identify or determine device types of devices (e.g., IoT devices), communication protocols associated with (e.g., utilized by) devices, and data payload formats associated with (e.g., utilized by) devices.

A first device, which can be associated with (e.g., communicatively connected to) the core network, can communicate data that can be intended to be communicated to a second device, which can be associated with, for example, a communication network associated with the core network. The second device, for example, can be associated with an application and/or can provide services (e.g., provide services to the first device and associated user).

The CMC can receive the data, and associated metadata (e.g., device identifier information that can identify the device), from the first device. The CMC can analyze the data and associated metadata. Based at least in part on the results of the analysis (e.g., analysis of the metadata) and the training of the CMC, the CMC can determine various characteristics associated with the first device, including, for example, the device type of the first device, a communication protocol utilized by the first device, and a data payload format utilized by the first device. Based at least in part on the analysis results, the characteristics associated with the device, and data management criteria relating to managing data communications, the CMC can identify the data (e.g., data payload) in the data communication, and can determine whether any, all, or a portion of the data, and/or other data (e.g., an average value of the data, or of a portion thereof) derived from the data, is to be communicated (e.g., forwarded) to the second device associated with a communication network. The data management criteria can comprise, relate to, or specify rules and policies for managing the communication of data between devices, including managing or determining whether any, all, or a portion of data, and/or other data derived from the data, is to be communicated (e.g., forwarded) to an intended receiving device (e.g., second device). For instance, the data management criteria can comprise, relate to, or specify threshold data values for different types of data, wherein only data that satisfies an applicable threshold data value is to be communicated (e.g., forwarded to) the intended receiving device (e.g., the second device); respective periodicity parameters for different types of data, applications, or services, wherein only data that satisfies an applicable periodicity parameter is to be communicated to the intended receiving device (e.g., only send data, such as non-critical or non-time sensitive data, periodically to the intended receiving device, in accordance with the applicable periodicity parameter); and/or other conditions or parameters that can be applied by the CMC to determine whether data is to be communicated to an intended receiving device.

In accordance with various other embodiments, a desired number of MEC components can be distributed to and located in various locations (e.g., various regions or population centers) throughout a desired area (e.g., a country, or portion thereof), and respective device platforms can be part of, integrated with, or otherwise associated with the MEC components. Respective MEC components can be associated with respective radio access network (RAN) devices. With regard a MEC component and associated RAN device, when a first device (e.g., wireless or mobile communication device) associated with the RAN device communicates data at least initially intended to be communicated to a second device, the MEC can determine whether the data is to be routed or diverted to the MEC component, instead of the core network, based at least in part on characteristics associated with the data and/or the first device, in accordance with the data management criteria. If the MEC component (or RAN device associated therewith based on information or instructions received from the MEC component) determines that the data is to be routed to the MEC component, the data can be forwarded from the RAN device to the MEC component, instead of the core network, which can facilitate terminating the user plane closer to the network edge, and reducing latency and enhancing (e.g., increasing) performance associated with data processing and data communications. The device platform of or associated with the MEC component can comprise a CMC, which can operate, such as more fully described herein, to process (e.g., analyze) the data and associated metadata, and determine various characteristics associated with the first device (e.g., device type of the first device, communication protocol utilized by the first device, and data payload format utilized by the first device), based at least in part on the results of analyzing the data and/or associated metadata. Based at least in part on the analysis results, the characteristics associated with the device, and data management criteria relating to managing data communications, the CMC can identify the data (e.g., data payload) in the data communication, and can determine whether any, all, or a portion of the data, and/or other data (e.g., an average value of the data, or of a portion thereof) derived from the data, is to be communicated (e.g., forwarded) to the second device, which can be associated with a communication network. With regard to any of the data, or other data derived therefrom, that is to be communicated to the second device, the MEC component can communicate such data to the second device via the communication network, which can be associated with the MEC component.

These and other aspects and embodiments of the disclosed subject matter will now be described with respect to the drawings.

FIG. 1 depicts a block diagram of an example, non-limiting system 100 that can manage communication of data associated with a core network to facilitate desirable and efficient communication of information between devices associated with the core network or an associated communication network, in accordance with various aspects and embodiments of the disclosed subject matter. The system 100 can comprise a core network 102 that can facilitate (e.g., enable) communications between communication devices (e.g., user equipment (UE)), including communication device 104 (COMM. DEVICE 104) and communication device 106 (COMM. DEVICE 106), associated with (e.g., communicatively connected to) the core network 102 or associated with a communication network 108, which can be associated with the core network 102.

The core network 102 and communication network 108 each can comprise various components, such as network (NW) node devices (e.g., radio network node devices) that can be part of the core network 102 or communication network 108 to facilitate communication of information between devices (e.g., communication devices 104 and 106) that can be associated with (e.g., communicatively connected to) the core network 102 or communication network 108. In some embodiments, the core network 102 can employ MIMO technology to facilitate data communications between devices (e.g., network node devices, communication devices, . . . ) associated with the core network 102.

As used herein, the terms "network node device," "network node," "network device," "network node component," and "network component" can be interchangeable with (or include) a network, a network controller, or any number of other network components. Further, as utilized herein, the non-limiting term radio network node, or network node (e.g., network device, network node device, . . . ) can be used herein to refer to any type of network node serving communications devices (e.g., 104, 106, . . . ) and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices also can comprise multiple antennas for performing various transmission operations (e.g., MIMO operations). A network node can comprise a cabinet and other protected enclosures, an antenna mast, and actual antennas. Network devices can serve several cells, also called sectors, depending on the configuration and type of antenna. Network node devices can be, for example, Node B devices, base station (BS) devices, access point (AP) devices, TRPs, and radio access network (RAN) devices. Other examples of network node devices can include multi-standard radio (MSR) node devices, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

A communication device (e.g., 104, 106, . . . ) also can be referred to as, for example, a device, a mobile device, or a mobile communication device. The term "communication device" can be interchangeable with (or include) a UE or other terminology. A communication device (or UE, device, . . . ) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, . . . ), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic eyeglasses, headwear, or bodywear having wireless communication functionality), a music or media player, speakers (e.g., powered speakers having wireless communication functionality), an appliance (e.g., a toaster, a coffee maker, a refrigerator, or an oven, . . . , having wireless communication functionality), a device associated or integrated with a vehicle (e.g., automobile, airplane, bus, train, or ship, . . . ), a drone, a home or building automation device (e.g., security device, climate control device, lighting control device, . . . ), an industrial or manufacturing related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

In accordance with various embodiments, the core network 102 can be or can comprise a 2G, 3G, 4G, 5G, or other next generation core network. The core network 102 can comprise a set of cells (not shown in FIG. 1) wherein respective cells can be associated with respective base stations. For example, a radio access network (RAN) 110 can comprise or be associated with a set of base stations that can serve communication devices (e.g., communication device 104) located in respective coverage areas served by respective base stations in the core network 102. In some embodiments, the RAN 110 can be a cloud-RAN (C-RAN) that can be located in or associated with a cloud computing environment, comprising various cloud network components of the core network 102. The respective cells of the set of cells can have respective coverage areas that can form the coverage area covered by one or more sectors of the core network 102. The respective communication devices (e.g., communication device 104) can be communicatively connected to the core network 102 via respective wireless communication connections with one or more of the respective cells. For example, communication device 104 can be connected to the core network 102 via a first cell, and another communication device can be connected to the core network 102 via the first cell or a second cell.

As disclosed, the number of devices, including and particularly IoT devices, is increasing rapidly and can be expected to number in the billions or even tens of billions within the next decade. The amount of data (e.g., user data, telemetry data, and/or other data) communicated by these devices via communication networks, including wireless communication networks (e.g., core network 102), can be expected to increase significantly as well. However, not all of this data may be desired (e.g., wanted or needed) by the destination device (e.g., communication device to which the data is being sent) or application, service, or entity associated with the destination device. If such undesired data is communicated to destination devices, network resources of core networks and/or other communication networks can be inefficiently and/or otherwise undesirably used (e.g., wasted) and/or undesired latency in data communications can be caused due to network congestion from communicating undesired data via the core networks and/or other communication networks.

To facilitate efficiently managing data communications of devices associated with the core network 102 and/or communication network 108, the core network 102 can comprise a device platform 112 (e.g., IoT platform) that can manage communication of data received by the core network 102 from various devices (e.g., IoT devices or other communication devices), including device 104, in accordance with data management criteria and associated policies, rules, etc., created based on the data management criteria. For instance, the device platform 112 can be integrated with the core network 102.

The device platform 112 can be associated with a gateway component 114 of the core network 102. In some embodiments, the device platform 112 can be part of or co-located with the gateway component 114. In other embodiments, the device platform 112 can be in proximity to (e.g., physically and/or logically in proximity to) and communicatively connected to the gateway component 114. The gateway component 114 can be or can comprise a packet data network (PDN) gateway (PGW) component or a gateway general packet radio services (GPRS) support node (GGSN) component. The gateway component 114 can be an interconnection point between the core network 102 and another communication network(s), such as communication network 108, and can facilitate the ingress and egress of data traffic associated with devices (e.g., device 104) to or from the core network 102. The gateway component 114 can perform or facilitate performing policy enforcement of policies of the core network 102, packet filtering of data packets communicated in the core network 102, packet screening or interception (e.g., lawful interception) of data packets communicated in the core network 102, and/or charging support for data communications in the core network 102. In some embodiments, the device platform 112 and/or the gateway component 114 can be or can comprise respective virtualized network functions, which can be created in the context of network function virtualization (NFV) and/or a software-defined network (SDN).

The core network 102 also can comprise a network component 116 (NW COMP. 116), which can be or can comprise a serving gateway component (SGW) and/or a mobility management entity (MME). The network component 116 can communicate, route, or forward data (e.g., data packets) to desired network components, such as the gateway component 114, or to desired devices (e.g., device 104) associated with the core network 102. In accordance with various embodiments, the network component 116 (e.g., an SGW of the network component 116) also can function as the mobility gateway or serving gateway, and/or as a mobility anchor for the user plane of the core network 102 during inter-base station (e.g., inter-eNodeB) handovers and as an anchor for mobility between LTE and other 3GPP technologies. In certain embodiments, the network component 116 (e.g., an MME of or associated with the network component 116) can provide mobility session management for the core network 102, can track which devices are registered on the core network 102, can authenticate or authorize devices or users that desire to connect or communicate using the core network 102, and/or can select an SGW and/or PGW to be used for a mobility session, among other functions.

With further regard to the device platform 112, the device platform 112 can act as an end point for devices (e.g., device 104) to send data (e.g., data intended to be sent to other devices (e.g., device 106)), as an integral part of the core network 102. The device platform 112 can be and/or can act as an edge computing element for devices (e.g., IoT devices) and data. The device platform 112, by being integrated with the core network 102, can move the processing of data received from devices (e.g., device 104) associated with (e.g., communicatively connected to) the core network 102 closer (e.g., physically and/or logically closer) to such devices (e.g., device 104).

The device platform 112 can comprise a communication management component (CMC) 118 that can manage communications of data from devices (e.g., device 104) associated with the core network 102 to other devices (e.g., device 106) associated with the communication network 108 or the core network 102, and/or applications, services, or entities associated with such other devices, based at least in part on the data management criteria. In some embodiments, the CMC 118 can be trained, using a desired machine learning or artificial intelligence (AI) technology, to learn to identify or determine device types of devices (e.g., device 104), communication protocols associated with (e.g., utilized by) devices, data payload formats associated with (e.g., utilized by) devices, and/or other characteristics (e.g., attributes), components, features, and/or functionality, etc., of or associated with devices, as more fully described herein.

The device 104 can be associated with (e.g., communicatively connected to) the core network 102 via the RAN 110. For instance, the device 104 can connect (e.g., wirelessly and communicatively connect) to the RAN 110 and associated core network 102. The network component 116, the CMC 118, or another component of the core network 102 can manage establishing a PDP context and a PDN connection of the device 104 to the gateway component 114 via a configured APN 120, which can be associated with (e.g., hosted on) the gateway component 114.

The device 104 can communicate data and associated metadata, wherein the data can be intended to be communicated to the device 106, which can be associated with (e.g., communicatively connected to), for example, the communication network 108 associated with the core network 102, or can be associated with the core network 102. The device 106, for example, can be associated with or implementing an application, can provide services (e.g., provide services to the first device and associated user), and/or can be associated with an entity. As a non-limiting example, the device 104 can be or can comprise one or more heart sensors that can sense heart conditions (e.g., heart rate, heart rate variability, and/or heart rhythms, . . . ) of a user of the device 104 and can generate sensor data (e.g., telemetry data), and/or notifications (e.g., alert regarding detection of an abnormal heart condition), based at least in part on (e.g., representing or corresponding to) the sensed heart conditions. The device 104 can communicate data, such as the sensor data and/or a notification relating to the user's heart conditions, and metadata to the core network 102 via the RAN 110, with the intention of communicating the data to the device 106, which can be associated with an application that can process the data, a service that can provide services relating to the health (e.g., heart health) of the user, and/or an entity (e.g., a physician or hospital) that can desire to monitor the heart conditions of the user.

The network component 116 can receive the data and associated metadata (e.g., device identifier information) and can forward (e.g., communicate or route) the data and associated metadata to the gateway component 114 (e.g., to the configured APN 120, which can be hosted on the gateway component 114), which can forward the data and associated metadata to the device platform 112. The CMC 118 can analyze the data and associated metadata to facilitate determining the characteristics (e.g., device type, communication protocol, and/or data payload format) associated with the device 104 and determining whether to communicate the data, or a portion thereof, and/or data that can be derived from the data, to the device 106. In some embodiments, the metadata can comprise device identifier information, such as a device identification (ID) of the device 104 (e.g., a device ID number or name, or a media access control (MAC) address), a device serial number, or other type of information that can identify or facilitate identifying the device 104, the device type (e.g., heart monitoring device, blood sugar monitoring device, or music player, . . . ) of the device 104, and/or other information relating to the device 104 (e.g., information identifying the manufacturer and/or model of the device, or version information (e.g., information identifying the operating system version, software version, firmware version, or hardware version of the device), . . . ). Based at least in part on the results of the analysis of the metadata and/or data, and based at least in part on the training of the CMC 118 (as more fully described herein), the CMC 118 can determine various characteristics associated with the device 104, including determining the device type of the device 104, the communication protocol associated with (e.g., utilized by) the device 104, and/or the data payload format associated with (e.g., utilized by) the device 104. Thus, the device 104 does not have to explicitly inform the CMC 118 as to the device type, communication protocol, data payload format, or other characteristics of or associated with the device 104.

The respective communication protocols that can be utilized by respective communication devices (e.g., device 104) can comprise, for example, hypertext transfer protocol (HTTP), hypertext transfer protocol secure (HTTPS), message queuing telemetry transport (MQTT) protocol, machine-to-machine (M2M) connectivity protocol, advanced message queuing protocol (AMQP), lightweight M2M (LwM2M) protocol, constrained application protocol (CoAP), user datagram protocol (UDP), transmission control protocol (TCP), Internet protocol (IP), and/or other desired network-related communication protocols. For example, some devices that are heart rate monitors or comprise heart rate monitors (or are or comprise other health-related devices, such as blood sugar monitors) can employ the MQTT protocol (or another desired communication protocol). The respective data payload formats that can be utilized by respective communication devices (e.g., device 104) can comprise, for example, binary format, hexadecimal format, decimal format, zoned decimal format, American Standard Code for Information Interchange (ASCII), extensible markup language (XML), and/or other desired types of data payload formats.

Also, the CMC 118 can determine whether any, all, or a portion of the data, and/or other data that can be derived from the data, is to be communicated to the device 106 associated with the application, service, and/or entity, based at least in part on the results of the analysis of the data and the defined data management criteria. In some embodiments, the CMC 118 can determine the particular data management criteria to apply to the data based at least in part on the device type of the device 104, the device ID of the device 104, the type of data, and/or another desired factor.

The data management criteria can relate to, for example, one or more thresholds (e.g., threshold values or parameters) that can indicate a defined threshold (e.g., a defined threshold for heart rate, blood sugar, or other type of characteristic or condition associated with the data) that is to be satisfied (e.g., satisfied by a data value) in order for it to be desired for the particular data to be communicated to the intended receiving device (e.g., device 106), a periodicity parameter that can indicate a periodicity or frequency for communicating particular data to the intended receiving device, priority (e.g., high, medium, or low priority) or criticality (e.g., critical data, or non-critical data) of data, other data (e.g., average or median data values over a desired time period, a summary of data over a desired time period, a minimum data value over a desired time period, or a maximum data value over a desired time period, . . . ) that is to be determined (e.g., determined by the CMC 118) and communicated to the intended receiving device instead of (or in addition to) raw data that was sent by the sending device (e.g., device 104), storage or retention of undesired data (e.g., data that is not to be communicated to the intended receiving device), and/or other desired factors or conditions. The CMC 118 can obtain (e.g., from a policy engine (not shown in FIG. 1)) or create, and can implement or enforce, one or more rules or policies (e.g., applicable rules or policies), which can be in accordance with the defined (e.g., applicable defined) data management criteria, to manage the data, including determining what data (if any) of the received data, and/or other data (if any) derived from the data, is to be communicated to the intended receiving device (e.g., device 106).

In response to the CMC 118 determining that none of the data received from the device 104 is to be communicated to the device 106 based at least in part on the analysis results and the applicable data management criteria, the CMC 118 can manage the data to not have the data (e.g., to prevent the data) from being communicated to the device 106 (e.g., intended receiving device). As indicated or specified by the applicable data management criteria, the CMC 118 can discard such undesired data, or can store such undesired data for a defined period of time or an indefinite period of time (e.g., to allow a user or entity, application, or service to obtain such data, if there is a change in conditions or a subsequent indication that such data is desired by the user or entity, application, or service).

In response to the CMC 118 determining that all of the data received from the device 104 is to be communicated to the device 106 based at least in part on the analysis results and the applicable data management criteria, the CMC 118 can manage the data to communicate the data to the device 106. For instance, the CMC 118 can communicate or facilitate communicating the data to the device 106 via the core network 102 and/or communication network 108 (if the device 106 is associated with the communication network 108). If the device 106 is associated with the communication network 108, the CMC 118 can communicate or facilitate communicating the data to the communication network 108, wherein one or more network components, such as network component 122 (NW COMP. 122), of the communication network 108 can communicate or facilitate communicating the data to the device 106.

In response to the CMC 118 determining that only a portion of the data, but not all of the data, received from the device 104 is to be communicated to the device 106 based at least in part on the analysis results and the applicable data management criteria, the CMC 118 can manage the data to communicate the desired portion of the data to the device 106. The CMC 118 also can discard the undesired portion of the data or can store the undesired portion of the data (e.g., in a data store) for a defined or indefinite period of time, in accordance with the applicable data management criteria. For instance, with regard to the desired portion of data to be sent, the CMC 118 can communicate or facilitate communicating the desired portion of the data to the device 106 via the core network 102 and/or communication network 108 (via the network component(s) (e.g., network component 122) of the communication network 108, if the device 106 is associated with the communication network 108).

In response to the CMC 118 determining that other data, which can be derived from the data received from the device 104, is to be communicated to the device 106 based at least in part on the analysis results and the applicable data management criteria, the CMC 118 can manage the data to determine or generate the other data, and can communicate such other data to the device 106. The CMC 118 also can discard the undesired data (e.g., original or raw data received from the device 104) or can store the undesired data (e.g., in a data store) for a defined or indefinite period of time, in accordance with the applicable data management criteria. In a non-limiting example, the data received from the device 104 can relate to a particular type of parameter (e.g., temperature of a machine associated with the device 104, heart rate of a user associated with the device 104, or blood sugar level of a user associated with the device 104), wherein the data relating to the particular type of parameter is received from the device 104 every five minutes. In this example, the applicable data management criteria (and corresponding applicable policies or rules) can indicate that such data for that particular type of parameter is only to be sent to the intended destination device (e.g., device 106) if such data is determined to satisfy (e.g., exceed) an applicable threshold value (e.g., threshold temperature level, heart rate, or blood sugar level), and further can indicate that, if such threshold value is not satisfied, an average or median data value of that particular type of parameter covering a defined period of time (e.g., six hours, or eight hours, . . . ) is to be determined (e.g., calculated) and sent to the intended destination device at a desired periodic time (e.g., every six hours, or every eight hours, . . . , in accordance with the applicable periodicity criterion or policy) instead of the original received data. Based at least in part on the results of analyzing the data and the applicable data management criteria, the CMC 118 can determine that the applicable threshold is not satisfied (e.g., not exceeded), and further can determine (e.g., calculate) the average or median data value (e.g., average or median temperature level, average or median heart rate, or average or median blood sugar level, . . . ) of that particular type of parameter (e.g., temperature level, heart rate, or blood sugar level, . . . ) with regard to the data of such data parameter type received over the defined period of time. At the desired periodic time, the CMC 118 can communicate or facilitate communicating such other data, e.g., the average or median data value of that particular type of parameter, to the device 106, via the core network 102 and/or communication network 108, instead of sending the original data received from the device 104 to the device 106.

In some instances, when in accordance with the applicable data management criteria, if particular data received from the device 104 is determined to satisfy an applicable threshold value, it can be desired to communicate not only that particular data, but also other data (e.g., average or median data value) over a defined period of time. In such instances, the CMC 118 can determine (e.g., calculate) such other data, and can communicate or facilitate communicating the particular data and the other data to the device 106, via the core network 102 and/or communication network 108.

It is to be appreciated and understood that, with regard to other data that can be derived from data received from the device 104, in accordance with any applicable data management criteria, the CMC 118 can determine (e.g., calculate) and generate virtually any desired other data based at least in part on the results of performing, analysis, calculations, and/or other operations on the data. As some non-limiting examples, with regard to the data received from the device 104, in accordance with applicable data management criteria, the CMC 118 can determine a summary of the data (e.g., summary of the current data and/or summary of the current and previous data received from the device 104 over a defined time period), a maximum data value of a data parameter (e.g., a data type) with regard to the current data and/or previous data received from the device 104 over a desired time period, a minimum data value of the data parameter with regard to the current data and/or previous data over a desired time period, a range of data values (e.g., maximum and minimum data values) of the data parameter with regard to the current data and/or previous data over a desired time period, a trend in data values of the data parameter with regard to the current data and/or previous data over a desired time period, an average or median value of the data parameter with regard to the current data and/or previous data over a desired time period, a standard deviation of the data parameter with regard to the current data and/or previous data over a desired time period, and/or other desired data calculations or data determinations with regard to the current data and/or previous data.

There may be some instances (e.g., relatively rare instances) where, even though the CMC 118 is trained to identify or determine the characteristics (e.g., device type, communication protocol, and/or data payload format) of or associated with various different types of devices (e.g., device 104), the CMC 118 may not be able to identify or determine the particular characteristics of a particular device. For example, the particular device can be a new device (e.g., new type of device, new model of device, and/or new manufacturer of device), or, even if not a new device, the particular device can recently have had its firmware or software updated (e.g., modified) such that the particular device is using a different communication protocol and/or data payload format than it previously used. Also, in other instances, the CMC 118 may not be able to determine particular characteristics of a particular device where the particular device and the data and/or metadata is being employed to attempt to attack the core network 102, a device associated therewith, and/or the communication network 108 associated therewith.

In some embodiments, the CMC 118 can manage instances where it is not able to determine all or a portion of the characteristics of a device, such as device 104, in part, by generating an exception message. For instance, when data and associated metadata is received from device 104, based at least in part on the results of analyzing the data and metadata, the CMC 118 can determine that it unable to identify or determine one or more characteristics, such as device type, communication protocol, and/or data payload format, of or associated with the device 104 or data. In response, the CMC 118 can determine that an exception event (e.g. inability to determine a desired characteristic(s) of or associated with the device or data) has occurred, generate an exception message regarding the exception event, and communicate the exception message to a communication device 124 associated with an entity (e.g., network operator, or network technician, . . . ), wherein the communication device 124 can be associated with (e.g., communicatively connected to) the core network 102 or communication network 108. The exception message can comprise information that can indicate the one or more characteristics of or associated with the device 104 or data and/or can comprise other desired (e.g., relevant) information (e.g., one or more characteristics of or associated with the device 104 or data that the CMC 118 was able to determine, and/or the data or metadata received from the device 104).

With regard to the exception event, the CMC 118 also can manage the data and associated metadata, in accordance with the defined data management criteria. In some embodiments, in accordance with the defined data management criteria, there can be a policy (e.g., exception policy or default policy) that can indicate how data and/or associated metadata received from a device (e.g., device 104) is to be handled, if the CMC 118 is unable to determine one or more desired characteristics of or associated with the device. For example, such policy can indicate that the data and/or associated metadata is to be stored (e.g., in a data store) by the CMC 118 and not communicated to the intended receiving device (e.g., device 106) at least until the one or more desired characteristics are determined (e.g., by the CMC 118, the entity, the communication device 124, or another component of the system 100) and/or until the device (e.g., device 104), data, and/or metadata are determined to not be malicious or otherwise undesirable, in accordance with the defined data management criteria. Based at least in part on such policy, the CMC 118 can store the data (e.g., in the data store) and can determine that the data and/or associated metadata is not to be communicated to the intended receiving device at least until the one or more desired characteristics of or associated with the device (e.g., device 104) are determined and/or until the device, data, and/or metadata are determined to not be malicious or otherwise undesirable.

The entity, the communication device 124, or another component of the system 100 can receive and analyze the exception message. Based at least in part on the results of the analysis of the exception message, the entity, communication device 124, or other component of the system 100 can determine desired characteristics (e.g., device type, communication protocol, and/or data payload format, . . . ) of or associated with the device (e.g., device 104) and/or can take action to facilitate determining such characteristics of or associated with the device. Also, based at least in part on the results of the analysis of the exception message, the entity, communication device 124, or other component of the system 100 can determine whether the device, data, and/or metadata is malicious or otherwise undesirable. In response to determining the desired characteristics of or associated with the device and determining that the device, data, and/or metadata is not malicious or otherwise undesirable (e.g., at least not undesirable in the sense of being corrupted data or metadata), the entity (e.g., via the communication device 124), the communication device 124, or other component of the system 100 (e.g., itself or via the communication device 124) can communicate the desired characteristics of or associated with the device to the CMC 118.

In response to the CMC 118 receiving information regarding (e.g., information identifying) the desired characteristics of or associated with the device (e.g., device 104) from the entity, communication device 124, or other component of the system 100, the CMC 118 can determine the desired characteristics, such as, for example, the device type of the device, the communication protocol utilized by the device, and/or the data payload format utilized by the device. With knowledge of the desired characteristics, the CMC 118 also can determine whether any, all, or a portion of the data, and/or other data derived from the data, is to be communicated to the intended receiving device (e.g., device 106), based at least in part on the results of analyzing the data and/or metadata, in accordance with the defined data management criteria. In response to determining that all or a portion of the data, and/or other data derived from the data, is to be communicated to the intended receiving device (e.g., device 106), the CMC 118 can communicate or facilitate communicating all or the portion of the data, and/or the other data, to the intended receiving device. In response to determining that none of the data (and/or other data) is to be communicated to the intended receiving device, the CMC 118 can not communicate the data (and/or the other data) to the intended receiving device, and can otherwise manage the data (e.g., store the data), in accordance with the defined data management criteria.

It is to be appreciated and understood that, while not shown in FIG. 1, the core network 102 also can comprise one or more other network components that can be arranged, configured, and/or connected to facilitate communicating data between devices (e.g., device 104) associated with the core network 102.

The disclosed subject matter, by employing the device platform 112 (including the CMC 118) to manage data communications associated with the core network 102, can enhance (e.g., improve) data communications of devices via the core network 102, reduce latency associated with data communications via the core network 102 and communication network 108, reduce network congestion in the core network 102 and communication network 108, and reduce the use (e.g., reduce or minimize the undesired or unnecessary use) of network resources by the core network 102 and communication network 108 in connection with data communications, as compared to traditional systems and techniques for handling data communications associated with core or communication networks. Also, the disclosed subject matter, by employing the device platform 112 (including the CMC 118), including using machine learning and/or AI technology to train the CMC 118 to identify, determine, and/or distinguish between respective characteristics (e.g., device types, communication protocols, and/or data payload formats, . . . ) of or associated with respective devices, can further enhance data communications associated with the core network 102, as compared to traditional systems and techniques for handling data communications associated with core or communication networks.

These and other aspects and embodiments of the disclosed subject matter will now be described with regard to the other drawings.

Figure 2:
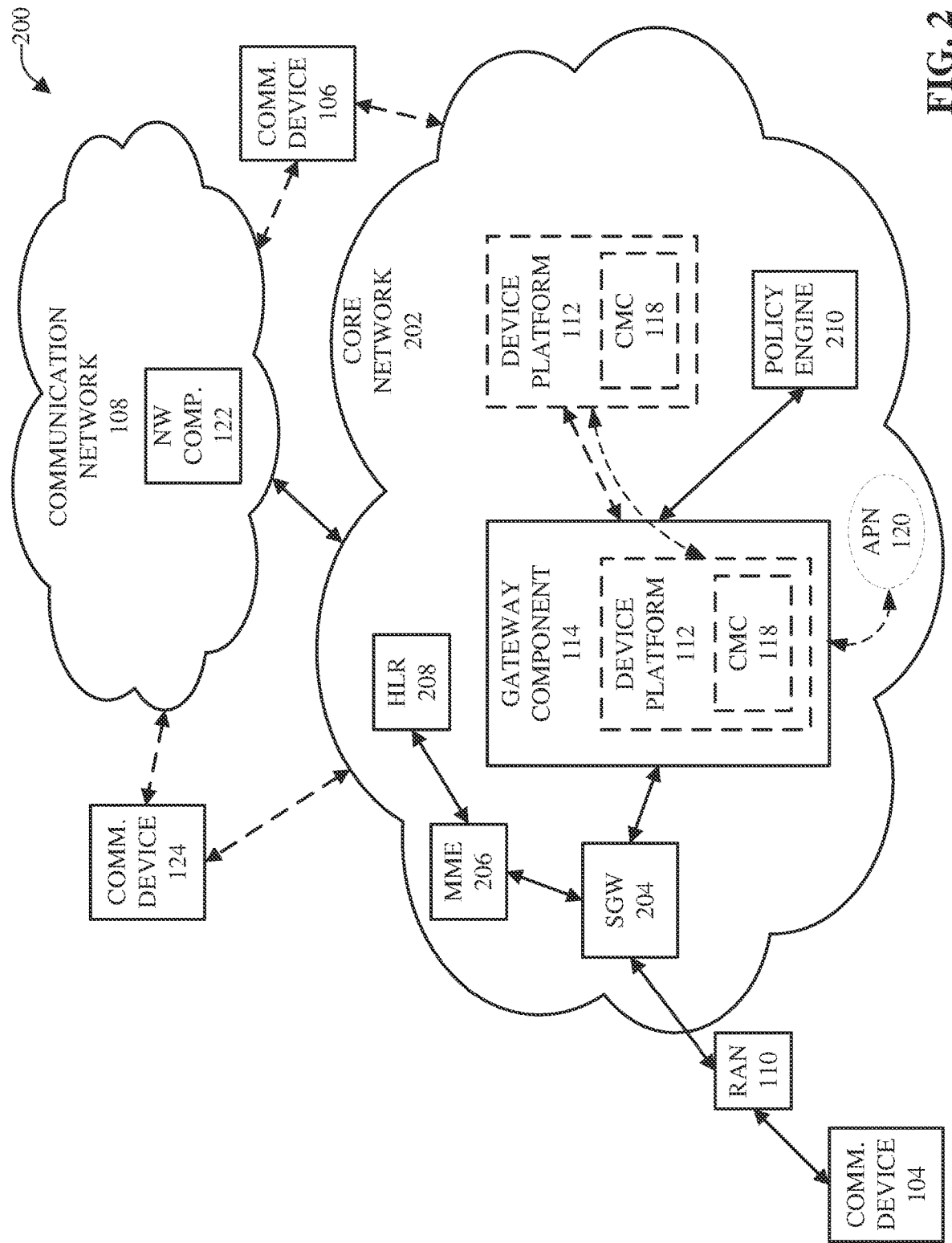
FIG. 2 illustrates a block diagram of another example, non-limiting system that can manage communication of data associated with a core network to facilitate desirable and efficient communication of information between devices associated with the core network or an associated communication network, in accordance with various aspects and embodiments of the disclosed subject matter.

Referring to FIG. 2, FIG. 2 illustrates a block diagram of another example, non-limiting system 200 that can manage communication of data associated with a core network to facilitate desirable and efficient communication of information between devices associated with the core network or an associated communication network, in accordance with various aspects and embodiments of the disclosed subject matter. The system 200 can comprise a core network 202 that can employ the device platform 112 to facilitate managing data being communicated via the core network 202, as more fully described herein.

The system 200 also can comprise a communication network 108 that can be associated with the core network 202, wherein the communication network can comprise various network components, including network component 122, that can facilitate communicating or routing data through the communication network 108 and to desired devices (e.g., device 106) that can be associated with (e.g., communicatively connected to) the communication network 108. The system 200 also can comprise various devices, including device 104 and device 106, that can be associated with (e.g., communicatively connected to) the core network 202 or the communication network 108. For instance, the device 104 can be connected (e.g., wirelessly connected) to the core network 202 via the RAN 110 (e.g., a base station of the RAN 110).

The core network 202 can comprise the gateway component 114, which can comprise or be associated with the device platform 112, which can include the CMC 118, as more fully described herein. The gateway component 114 also can be associated with (e.g., can host) an APN (e.g., a configured APN), such as APN 120, as more fully described herein.

In some embodiments, the core network 202 can comprise an SGW 204, which can be associated with the RAN 110, an MME 206, and the gateway component 114. In certain embodiments, the MME 206 can be associated with a home location register (HLR) 208. The SGW 204 can be or can function as the mobility gateway or serving gateway, and/or as a mobility anchor for the user plane of the core network 202 during inter-base station handovers and as an anchor for mobility between LTE and other 3GPP technologies. The MME 206 can provide mobility session management for the core network 202, can track which devices are registered on the core network 202, can authenticate or authorize devices or users that desire to connect or communicate using the core network 202, and/or can select an SGW (e.g., SGW 204) and/or PGW (e.g., gateway component 114) to be used for a mobility session, among other functions that can be performed by the MME 206.

The HLR 208 can be or can comprise a database of user information of users (e.g., subscribers) of the core network 202 (e.g., users using devices and having subscriptions with or associated with the core network 202 or associated core network operator). The database of the HLR 208 can comprise user information regarding users, including address information, account status of accounts with or associated with the core network 202, user preferences of the user and/or other desired information regarding users or devices.

The core network 202 also can include a policy engine 210 (e.g., policy and charging rules function (PCRF)) that can be associated with (e.g., communicatively connected to) the gateway component 114. The policy engine 210 also can be associated with the device platform 112. The policy engine 210 can determine or generate policy rules that can be applied or enforced by the policy engine 210, the device platform 112 (e.g., the CMC 118 of the device platform 112), or another component(s) of the core network 202. The policy rules can relate to, for example, management of communication of data associated with (e.g., communicated by) devices associated with the core network 202, providing desirable communication services (e.g., desirable quality of service (QoS) or quality of experience (QoE)) to devices and associated device users, and/or charges (e.g., financial charges or other charges, tracking and charging for voice or data usage associated with a subscription) associated with communication of data via the core network 202, etc. The policy engine 210, the CMC 118, or another component(s) of the core network 202 can determine at least a portion of the policy rules based at least in part on the defined data management criteria and/or other information (e.g., information relating to data management, such as a threshold parameter, a periodicity parameter, a priority parameter, a data criticality parameter, parameter relating to a data type of certain data; information relating to a characteristic of or associated with a device; information relating to storage or retention of data, such as raw data received from a device; and/or information relating to determining other data (e.g., average or median data value, standard deviation value, . . . ) that can be derived from the raw data; . . . ) received from a user, application, service, or entity (e.g., via a communication device), as more fully described herein.

The CMC 118, policy engine 210, or another component(s) of the core network 202 can enforce the policy rules. For example, the CMC 118, policy engine 210, or another component(s) of the core network 202 can enforce the policy rules to facilitate managing communication of data associated with devices (e.g., received from devices associated with the core network 202), in accordance with the defined data management criteria.

Figure 3:
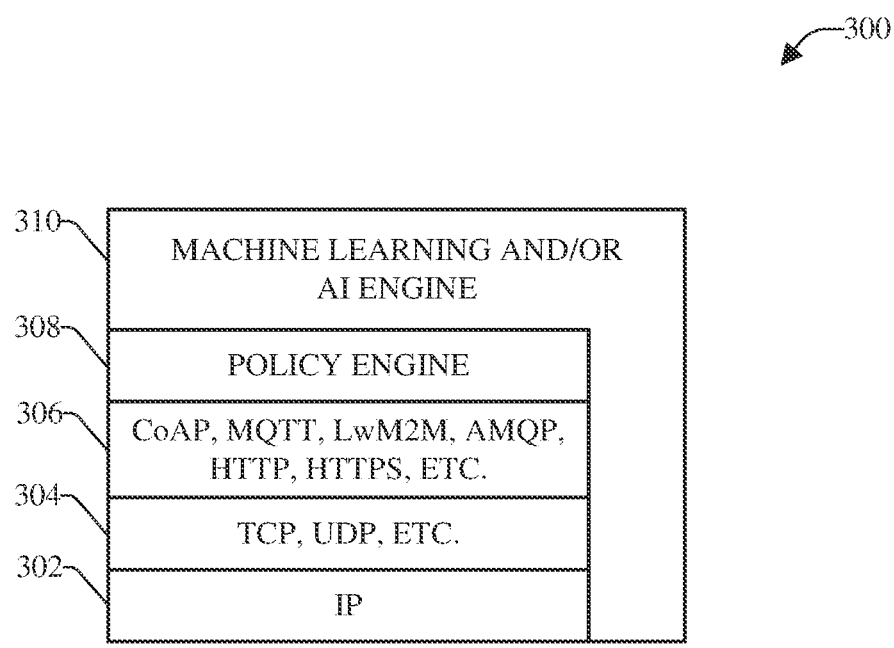
FIG. 3 depicts a block diagram of an example, non-limiting layer stack that can be employed by the device platform to facilitate managing communication of data associated with the core network to facilitate desirable and efficient communication of information between devices associated with the core network or an associated communication network, in accordance with various aspects and embodiments described herein.

Turning to FIG. 3, FIG. 3 depicts a block diagram of an example, non-limiting layer stack 300 that can be employed by the device platform to facilitate managing communication of data associated with the core network to facilitate desirable and efficient communication of information between devices associated with the core network or an associated communication network, in accordance with various aspects and embodiments described herein. The layer stack 300 can comprise a first layer 302 that can comprise or relate to IP. The device platform can employ the first layer 302 to facilitate packet-based (e.g., data packet-based) communication in the core network or associated communication network, in accordance with Internet Protocol.

The layer stack 300 also can include a second layer 304 that can relate to various IP-based communication network protocols (e.g., IP-based communication network protocols), including, for example, TCP and UDP. TCP and UDP are protocols that often can be utilized in IP-based communication networks. The device platform can employ the second layer 304 to facilitate packet-based communication in the core network or associated communication network. For instance, the TCP can facilitate reliable and ordered communication of data, as well as error-checked communication of data, via the core network or associated communication network. The UDP can facilitate providing connectionless communication of data (e.g., datagrams) that can provide for relatively reduced latency (e.g., as compared to TCP or other some other protocols) and integrity verification of the data payload and associated header information, although other protocols (e.g., TCP) can be more reliable than UDP.

The layer stack 300 further can comprise a third layer 306 that can relate to various communication protocols that can be utilized by devices associated with the core network or an associated communication network to communicate data between devices (e.g., between devices via the core network and/or communication network). The various communication protocols can include, for example, CoAP, MQTT, LwM2M, AMQP, HTTP, HTTPS, and/or other desired communication protocols, such as, but not limited to, other communication protocols disclosed herein. Different types of communication devices (e.g., different types of mobile or smart phones, electronic pads or tablets, computers, IoT devices, . . . ) can utilize different types of communication protocols.

The device platform can employ the third layer 306 to communicate respective data (e.g., data packet-based communication) between respective communication devices associated with the core network or associated communication network utilizing respective communication protocols associated with (e.g., utilized or desired by) the respective communication devices.

In some embodiments, the layer stack 300 can comprise a fourth layer 308 that can relate to a policy engine (e.g., PCRF) that can be utilized by the device platform to facilitate generating and enforcing policies and/or rules that can be utilized to manage the communication of data associated with devices that are associated with (e.g., connected to) the core network. The policies and/or rules can be determined and/or generated based at least in part on the defined data management criteria, such as more fully described herein. The defined data management criteria can comprise respective applicable data management criteria, which can correspond to respective policies and/or rules of the policy engine, that can be applicable to respective data received from respective devices (e.g., communication devices, such as IoT devices, smart phones, or computers, . . . ) associated with the core network to facilitate managing communication of data (e.g., by the CMC of the device platform) in the core network and/or associated communication network.

The layer stack 300 also can comprise a fifth layer 310 that can relate to a machine learning and/or AI engine of the device platform (e.g., of the CMC of the device platform) that can be part of and utilized by the device platform to learn respective characteristics (e.g., device type, communication protocols, and/or data payload format, . . . ) of or associated with respective devices (e.g., communication devices), based at least in part on information (e.g., training data and/or other information) that can be applied to (e.g., input to) the machine learning and/or AI engine to train the machine learning and/or AI engine to determine, identify, distinguish, or learn the respective characteristics of or associated with the respective devices. For instance, with regard to respective devices, the CMC can utilize the machine learning and/or AI engine to analyze metadata and/or data received from a device associated with the core network to determine the characteristics of or associated with the device to facilitate managing the communication of the data received from the device, as more fully described herein.

Figure 4:
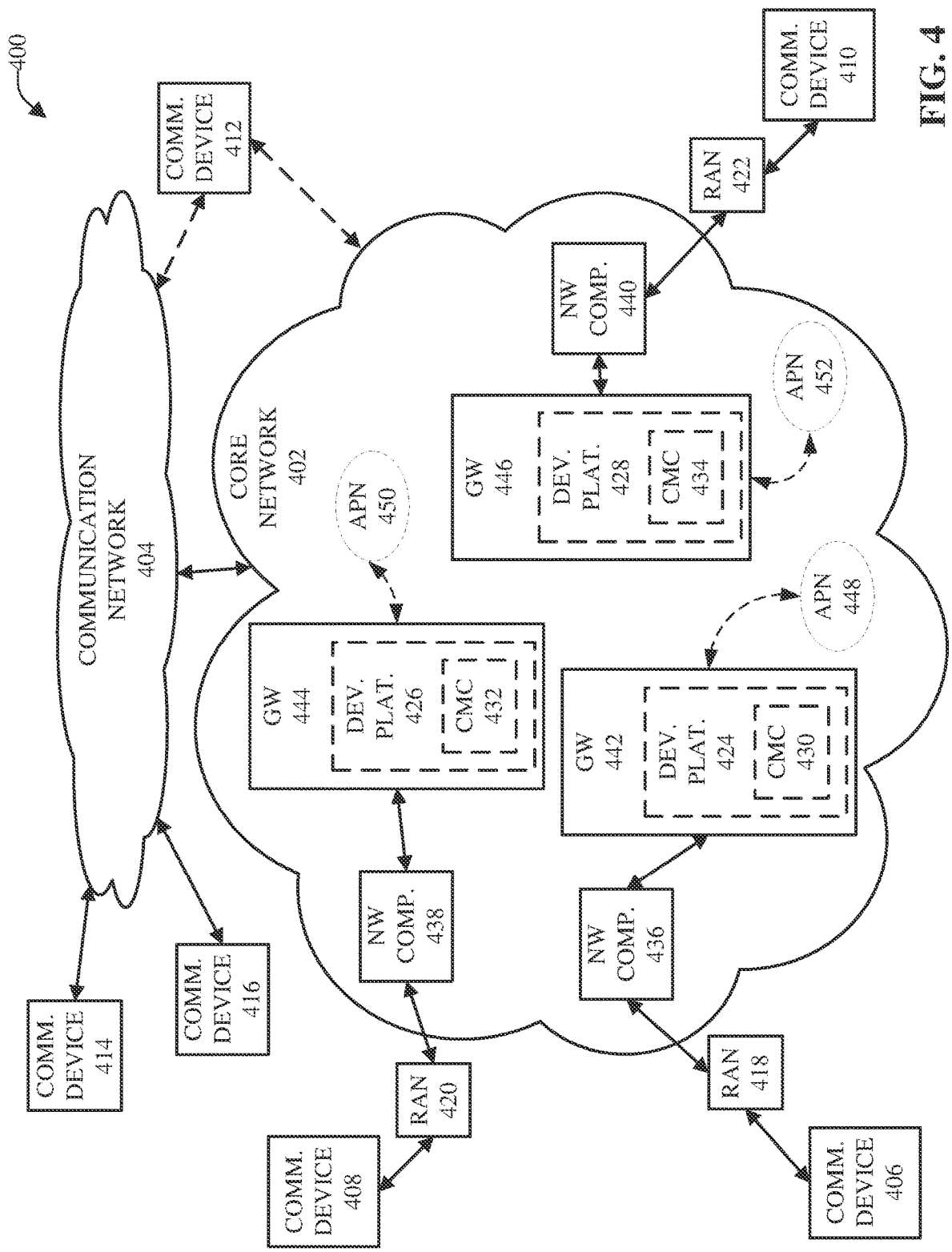
FIG. 4 presents a block diagram of an example, non-limiting system that can employ multiple device platforms, and multiple access point names, in a core network to manage communication of data associated with the core network to facilitate desirable and efficient communication of information between devices associated with the core network or an associated communication network, in accordance with various aspects and embodiments of the disclosed subject matter.

Referring to FIG. 4, FIG. 4 presents a block diagram of an example, non-limiting system 400 that can employ multiple device platforms (e.g., multiple device platform instances), and multiple APNs, in a core network to manage communication of data associated with the core network to facilitate desirable and efficient communication of information between devices associated with the core network or an associated communication network, in accordance with various aspects and embodiments of the disclosed subject matter. The system 400 can comprise a core network 402 and a communication network 404, which can be associated with (e.g., communicatively connected to) the core network 402. The system 400 also can comprise various devices (e.g., communication devices), including devices 406, 408, 410, 412, 414, and/or 416 (COMM. DEVICE(s) 406 through 416), that can respectively be associated with (e.g., communicatively connected to) the core network 402 or communication network 404 via respective RANs, such as RAN 418, RAN 420, and RAN 422 (e.g., respective base stations of the respective RANs).

The core network 402 can comprise a desired number of device platforms (e.g., IoT platforms), including device platform 424 (DEV. PLAT. 424), device platform 426 (DEV. PLAT. 426), and device platform 428 (DEV. PLAT. 428), that can be distributed throughout the core network 402 in desired physical and/or logical locations of the core network 402. The respective device platforms (e.g., 424, 426, 428, . . . ) can include respective CMCs, including CMC 430, CMC 432, and CMC 434. The respective device platforms (e.g., 424, 426, 428, . . . ) and the respective CMCs (e.g., 430, 432, CMC 434, . . . ) each can be the same as or similar to, and/or can comprise the same or similar functionality as, respective components (e.g., respectively named components), such as more fully described herein. The system 400 can enable respective device platforms (e.g., 424, 426, 428, . . . ), including the respective CMCs (e.g., 430, 432, 434, . . . ), to respectively and desirably (e.g., efficiently, suitably, and/or optimally) manage respective data communications of respective devices (e.g., 406, 408, 410, . . . ) associated with the core network 402.

The core network 402 also can comprise various other network components, including network component 436, network component 438, network component 440, gateway component 442, gateway component 444, and gateway component 446. For instance, the network component 436 (NW COMP. 436), network component 438 (NW COMP. 438), and network component 440 (NW COMP. 440) can be or can comprise SGWs, and can be respectively associated with (e.g., communicatively connected to) RAN 418, RAN 420, and RAN 422. The network component 436, network component 438, and network component 440 also can be respectively associated with gateway component 442 (GW 442), gateway component 444 (GW 444), and gateway component 446 (GW 446). The respective device platforms (e.g., 424, 426, 428, . . . ) can be part of, co-located with, or otherwise associated with the respective gateway components (e.g., 442, 444, 446, . . . ).

A desired number of APNs can be distributed throughout the core network 402. For instance, respective APNs, including configured APN 448, configured APN 450, and configured APN 452, can be distributed across and associated with the respective gateway components 442, 444, and 446. For example, gateway component 442 can host configured APN 448, gateway component 444 can host configured APN 450, and gateway component 446 can host configured APN 452. Distributing APNs (e.g., 448, 450, 452, . . . ) across the various gateway components (e.g., 442, 444, 446, . . . ) can reduce or minimize latency between the devices (e.g., 406, 408, 410, . . . ) and the core network 402 (e.g., the packet edge network). As disclosed, the respective device platforms (e.g., 424, 426, 428, . . . ) can be associated with the respective gateway components (e.g., 442, 444, 446, . . . ). For instance, the respective device platforms (e.g., 424, 426, 428, . . . ), including the respective CMCs (e.g., 430, 432, 434, . . . ), can be replicated alongside the respective gateway components (e.g., 442, 444, 446, . . . ). In some embodiments, the respective device platforms (e.g., 424, 426, 428, . . . ) and/or the respective gateway components (e.g., 442, 444, 446, . . . ) can be or can comprise respective virtualized network functions, which can be created or replicated in the context of SDN and/or NFV. It is to be appreciated and understood that, for reasons of brevity and clarity, the respective device platforms (e.g., 424, 426, 428) are depicted in FIG. 4 as being part of the respective gateway components (e.g., 442, 444, 446), but alternatively, the respective device platforms (e.g., 424, 426, 428) can be adjacent or in proximity to, and can be communicatively connected to, the respective gateway components (e.g., 442, 444, 446), such as described herein and depicted in the figures, such as FIGS. 1 and 2.

In some embodiments, the respective devices (e.g., 406, 408, 410, . . . ) can be associated with (e.g., connected to) respective gateway components (e.g., 442, 444, 446, . . . ) and associated respective device platforms (e.g., 424, 426, 428, . . . ) and associated respective configured APNs (e.g., 448, 450, 452, . . . ) that are located, physically and/or logically, in closer proximity to the respective devices (e.g., 406, 408, 410, . . . ) than the other gateway components, device platforms, and configured APNs. This also can facilitate further reducing or minimizing latency between the devices (e.g., 406, 408, 410, . . . ) and the core network 402.

For example, the device 406 can be determined (e.g., by the CMC 430, network component 436, or another component of the core network 402) to be located, physically and/or logically, in closer proximity to the gateway component 442, device platform 424, and configured APN 448 than to gateway components 444 and 446, device platforms 426 and 428, and configured APNs 450 and 452. Based at least in part on the device 406 being determined to be located, physically and/or logically, in closer proximity to the gateway component 442, device platform 424, and configured APN 448, the CMC 430, network component 436, or another component of the core network 402 can determine that the device 406 is to be associated with the gateway component 442, device platform 424, and configured APN 448. Similarly, based at least in part on the device 408 being determined (e.g., by the CMC 432, network component 438, or another component of the core network 402) to be located, physically and/or logically, in closer proximity to the gateway component 444, device platform 426, and configured APN 450, the CMC 432, network component 438, or another component of the core network 402 can determine that the device 408 is to be associated with the gateway component 444, device platform 426, and configured APN 450. Also, based at least in part on the device 410 being determined (e.g., by the CMC 434, network component 440, or another component of the core network 402) to be located, physically and/or logically, in closer proximity to the gateway component 446, device platform 428, and configured APN 452, the CMC 434, network component 440, or another component of the core network 402 can determine that the device 410 is to be associated with the gateway component 446, device platform 428, and configured APN 452.

The respective device platforms (e.g., 424, 426, 428, . . . ), including the respective CMCs (e.g., 430, 432, 434, . . . ), can manage the respective data communications of the respective devices (e.g., 406, 408, 410, . . . ), including determining whether any, all, a portion of the respective data, and/or respective other data derived from the respective data, is to be communicated to the respective intended receiving devices (e.g., 412, 414, 416, . . . ) that can be associated with the communication network 404 or the core network 402, based at least in part on the defined data management criteria, as more fully described herein. In response to determining that all or a portion of data received from a device (e.g., 406), and/or other data derived from such data by a CMC (e.g., 430), is to be communicated to the intended destination device (e.g., 412), the CMC can communicate or facilitate communicating all or the desired portion of data, and/or the other data, to the intended destination device, which can be associated with the communication network 404 or the core network 402.

Figure 5:
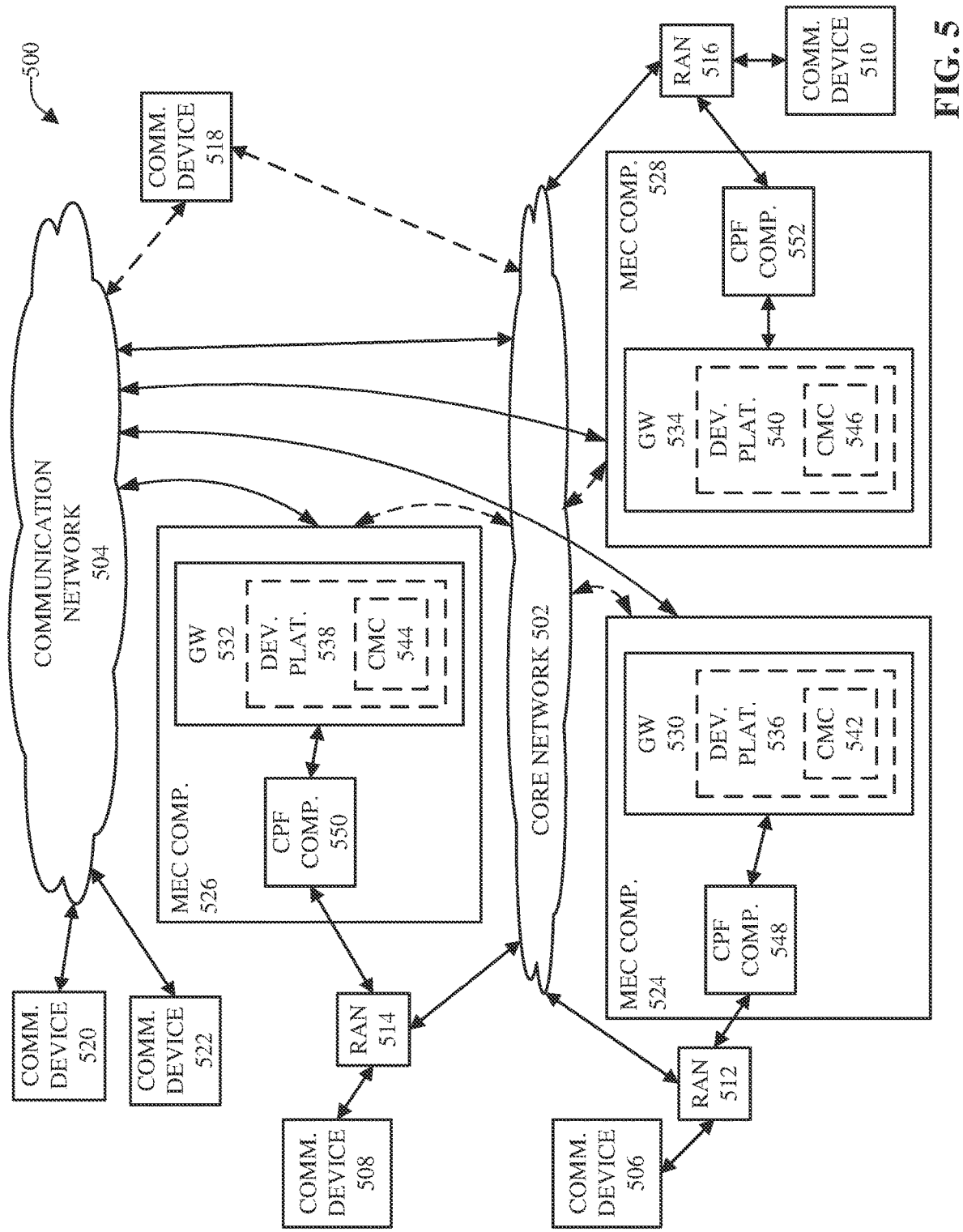
FIG. 5 depicts a block diagram of an example, non-limiting system that can comprise one or more multi-access edge computing (MEC) components, which can include one or more device platforms, to manage communication of data to facilitate desirable and efficient communication of data between devices, in accordance with various aspects and embodiments of the disclosed subject matter.

FIG. 5 depicts a block diagram of an example, non-limiting system 500 that can comprise one or more multi-access edge computing (MEC) components, which can include one or more device platforms (e.g., IoT platforms), to manage communication of data to facilitate desirable and efficient communication of data between devices, in accordance with various aspects and embodiments of the disclosed subject matter. The system 500 can comprise a core network 502 and a communication network 504, which can be associated with (e.g., communicatively connected to) the core network 502, such as described herein. The system 500 also can include various communication devices, such as communication device 506 (COMM. DEV. 506), communication device 508 (COMM. DEV. 508), and communication device 510 (COMM. DEV. 510), that can be associated with (e.g., communicatively connected to) respective RANs, such as RAN 512, RAN 514, and RAN 516, to connect the various communication devices (e.g., 506, 508, 510, ...) to the core network 502 and/or associated communication network 504, wherein the respective RANs (e.g., 512, 514, 516, ...) can be associated with the core network 502. The respective RANs (e.g., 512, 514, 516, ...) and communication devices (e.g., 506, 508, 510, ...) can be located in respective locations (e.g., respective regions) that can be serviced by the core network 502. For example, RAN 512 and communication device 506 can be located in a first part of a country (e.g., a southwest coast region of the United States), RAN 514 and communication device 508 can be located in a second part of a country (e.g., a northwest coast region of the United States), RAN 516 and communication device 510 can be located in a third part of a country (e.g., a southeast coast region of the United States), and/or other RANs and associated communication devices can be located in other parts of the country (e.g., midwest region, northern region, southern region, or northeast coast region, etc., of the United States).

The communication devices (e.g., 506, 508, 510, ...) can be communicating data that is at least initially intended to be communicated to other communication devices, such as communication device 518 (COMM. DEV. 518), communication device 520 (COMM. DEV. 520), and communication device 522 (COMM. DEV. 522), such as described herein, wherein the other communication devices (e.g., 518, 520, 522, ...) can be associated with (e.g., communicatively connected to) the communication network 504 or core network 502. For instance, communication device 506 can be communicating data that is at least initially intended to be sent to communication device 518, which can be associated with a first application, service, or entity, communication device 508 can be communicating data that is at least initially intended to be sent to communication device 520, which can be associated with a second application, service, or entity, and/or communication device 510 can be communicating data that is at least initially intended to be sent to communication device 522, which can be associated with a third application, service, or entity.

In accordance with various embodiments, the system 500 can comprise a desired number of MEC components, including MEC component 524, MEC component 526, and MEC component 528, that can be distributed to and located in various locations (e.g., various regions or population centers) throughout a desired area (e.g., a country, or portion thereof). For example, MEC component 524 can be located in a first location (e.g., first region or population center, such as a major or highly populated city or metropolitan area), MEC component 526 can be located in a second location (e.g., second region or population center), and MEC component 528 can be located in a third location (e.g., third region or population center). Each of the MEC components (e.g., 524, 526, 528, ...) can have the capability to desirably terminate the user plane significantly (e.g., much) closer to the network edge of the mobile network (e.g., mobile network, comprising the core network 502, MEC components (e.g., 524, 526, 528, ... ), RANs (e.g., 512, 514, 516, ... ), and other components or devices). An MEC component (e.g., 524, 526, or 528) essentially can be a hop away (e.g., can be physically and/or logically adjacent to or in proximity to) a base station (e.g., a base station or eNodeB) of a RAN (e.g., 512, 514, or 516). For instance, the respective MEC components (e.g., 524, 526, 528, ...) can be associated with (e.g., communicatively connected to) the respective RANs (e.g., 512, 514, 516, ...).

The MEC components (e.g., 524, 526, 528, ...) can provide enhanced (e.g., improved, or higher) performance and reduced latency with regard to the processing and communication of data, for example, as a result of the distributed computing provided by the MEC components that can be closer to the UEs (e.g., communication devices 506, 508, 510, ...) themselves. The MEC component can be particularly relevant in the context of 5G networks in order to provide the low-latency capabilities that can be desired (e.g., wanted or required) for a number of different use cases and solutions (e.g., medical or emergency-related uses and solutions, uses and solutions relating to autonomous vehicles, or uses and solutions relating to manufacturing or industry, ... ), although it is to be appreciated and understood that MEC components also can be useful (e.g., useful to reduce latency or otherwise improve performance in data processing and communications) in the context of other xG networks, wherein x can be a desired number (e.g., 2, 3, 4, ... ).

The respective MEC components (e.g., 524, 526, 528, ... ) can comprise respective gateway components, including gateway component 530 (GW 530), gateway component 532 (GW 532), and gateway component 534 (GW 534), wherein, for example, gateway component 530 can be part of MEC component 524, gateway component 532 can be part of MEC component 526, and gateway component 534 can be part of MEC component 528. In some embodiments, the gateway components (e.g., 530, 532, 534, ...) can be the same as or similar to the gateway components (e.g., PGWs or GGSNs) and/or user plane functions, such as described herein.

The respective MEC components (e.g., 524, 526, 528, ... ) also can comprise respective device platforms, including device platform 536 (DEV. PLAT. 536), device platform 538 (DEV. PLAT. 538), and device platform 540 (DEV. PLAT. 540), wherein, for example, device platform 536 can be part of, integrated with, or otherwise associated with MEC component 524, device platform 538 can be part of, integrated with, or otherwise associated with MEC component 526, and device platform 540 can be part of, integrated with, or otherwise associated with MEC component 528. The respective device platforms (e.g., 536, 538, 540, ... ) can comprise respective CMCs, such as, for example, CMC 542 of the device platform 536, CMC 544 of the device platform 538, and CMC 546 of the device platform 540. In some embodiments, the device platforms (e.g., 536, 538, 540, ...) and respectively associated CMCs (e.g., 542, 544, 546, ... ) can be the same as or similar to the device platforms and CMCs, such as more fully described herein. In accordance with various embodiments, the respective device platforms (e.g., 536, 538, 540, . . . ) can be associated with (e.g., adjacent or in proximity to, and communicatively connected to) the respective gateway components (e.g., 530, 532, 534, . . . ), or can be part of the respective gateway components (e.g., 530, 532, 534, . . . ). It is to be appreciated and understood that, for reasons of brevity and clarity, the respective device platforms (e.g., 536, 538, 540) are depicted in FIG. 5 as being part of the respective gateway components (e.g., 530, 532, 534), but alternatively, the respective device platforms (e.g., 536, 538, 540) can be adjacent or in proximity to, and can be communicatively connected to, the respective gateway components (e.g., 530, 532, 534), such as described herein and depicted in the figures, such as FIGS. 1 and 2.

An MEC component (e.g., 524, 526, or 528) can provide a desirable (e.g., ideal, suitable, or favorable) environment for the deployment of the device platform (e.g., 536, 538, or 540) itself. Data (e.g., telemetry or other type(s) of data) being received from the communication devices (e.g., 506, 508, 510, . . . ) can be consumed and processed (e.g., by the device platform) at the edge of the mobile network itself. The latency of data from the communication devices (e.g., 506, 508, 510, . . . ) to the respective device platforms (e.g., 536, 538, 540, . . . ) in the respective MEC components (e.g., 524, 526, 528, . . . ) can be desirably (e.g., relatively and/or very) low, and, as a result, the MEC components and respectively associated device platforms can be desirably suited for a number of applications, including, for example, manufacturing and industry (e.g., smart manufacturing and industry 4.0), autonomous vehicles, drones, medical or emergency uses, and/or many other types of applications. Depending in part on the use case and applicable specifications (e.g., applicable requirements or criteria), data (e.g., telemetry or other type(s) of data) being sent from a communication device (e.g., 506) can be forwarded or routed to the nearest device platform (e.g., 536) that can be located in the nearest MEC component (e.g., 524). As described herein, the device platforms (e.g., 536, 538, 540, . . . ) can be deployed in a distributed manner across the MEC components (e.g., 524, 526, 528, . . . ) within the mobile network. The data from a communication device (e.g., 506, 508, or 510, . . . ) can be routed to the nearest gateway component (e.g., 530, 532, or 534, . . . ) and associated device platform (e.g., 536, 538, or 540, . . . ) in the MEC component (e.g., 524, 526, or 528, . . . ) that can be serving the RAN (e.g., 512, 514, or 516, . . . ) to which the communication device is attached.

The disclosed subject matter, by incorporating a device platform within an MEC component, can have a number of advantages, including, for example, that the processing of data coming from communication device can be performed (e.g., by the device platform) significantly closer to the communication device itself, such as disclosed herein. As a result, any actions that can be desired (e.g., wanted or needed) to be triggered from or based on the data can be accomplished (e.g., by the device platform of the MEC component) significantly quicker, as compared to other communication systems. Additionally, the traffic load can be distributed across a number of device platforms and associated MEC components, which can reduce or mitigate congestion at a particular device platform and associated MEC component and/or in the core network or other part of the mobile network.

In some embodiments, the respective MEC components (e.g., 524, 526, 528, . . . ) each can have respective control plane function components, such as control plane function component 548 (CPF COMP. 548) of the MEC component 524, control plane function component 550 (CPF COMP. 550) of the MEC component 526, and control plane function component 552 (CPF COMP. 552) of the MEC component 528. The respective control plane function components (e.g., 548, 550, 552, . . . ) can be associated with the respective RANs (e.g., 512, 514, 516, . . . ) and the respective gateway components (e.g., 530, 532, 534, . . . ). For example, control plane function component 548 can be associated with (e.g., communicatively connected to) RAN 512 and gateway component 530, control plane function component 550 can be associated with RAN 514 and gateway component 532, and control plane function component 552 can be associated with RAN 516 and gateway component 534.

Each of the control plane function components (e.g., 548, 550, 552, . . . ) can control (e.g., manage) data (e.g., manage the routing of data), including determining whether data communicated by a communication device (e.g., 506, 508, or 510, . . . ) is to be routed from the RAN (e.g., 512, 514, or 516, . . . ) to (e.g., diverted to) its MEC component (e.g., 524, 526, or 528, . . . ) or is to proceed to be communicated from the RAN to the core network 502, based at least in part on characteristics of the data or the communication device, in accordance with the defined data management criteria. The control plane function component (e.g., 548, 550, or 552, . . . ) of the MEC component (e.g., 524, 526, or 528, . . . ) can inform or instruct its associated RAN (e.g., 512, 514, or 516, . . . ) regarding the characteristics or types of data and/or the communication devices (e.g., types of communication devices) from which the data is sent for which the data is to be routed to the MEC component, based at least in part on characteristics of the data or the communication device that sent the data, in accordance with the defined data management criteria.

For instance, the defined data management criteria can specify or indicate that certain types of data (e.g., certain medical data (e.g., certain medical data relating to heart conditions received from heart sensing devices; or certain medical data relating to blood sugar levels received from blood sugar sensing devices), certain data from autonomous vehicles or drones, or certain data relating to manufacturing or industry is to be routed to the MEC component (e.g., 524, 526, or 528, . . . ), instead of the core network 502. Additionally or alternatively, the defined data management criteria can specify or indicate that data sent by certain types of communication devices (e.g., heart sensing or monitoring devices, blood sugar sensing or monitoring devices, communication devices of or associated with autonomous vehicles or drones, or communication devices associated with certain manufacturing or industrial facilities) is to be routed to the MEC component (e.g., 524, 526, or 528, . . . ), instead of the core network 502.

Additionally or alternatively, the defined data management criteria can specify or indicate that data having or associated with characteristics that indicate the processing and communication of the data has to satisfy certain conditions relating to latency, quality of service (QoS), or quality of experience (QoE) is to be routed to the MEC component (e.g., 524, 526, or 528, . . . ), instead of the core network 502. For example, the defined data management criteria can specify or indicate that data, which has or is associated with characteristics that indicate the processing and communication of the data has to be performed without exceeding a desired low latency level (e.g., a defined threshold maximum latency level, which can be a desirably low threshold level) and/or while providing at least a desired minimum QoS and/or QoE (e.g., a threshold minimum QoS and/or QoE), is to be routed to the MEC component (e.g., 524, 526, or 528, ... ), instead of the core network 502. Additionally or alternatively, the defined data management criteria can specify or indicate that data associated with a certain type of subscription is to be routed to the MEC component (e.g., 524, 526, or 528, ... ), instead of the core network 502. For instance, there can be different types of subscriptions that can be associated with a communication device, an associated user, or the data sent by the communication device. For example, a first type of subscription can provide for a higher level of service (e.g., lower latency, faster processing and communication, higher QoS level, and/or higher QoE level) with regard to processing and communicating data in the mobile network than a second type of subscription, which can provide for a lower level of service. When the data, associated communication device (e.g., 506, 508, or 510, ... ), or associated user is associated with the first type of subscription (e.g., when the user or device has the first type of subscription), data communicated by the communication device to the RAN (e.g., 512, 514, or 516, ... ) can be routed to the associated MEC component (e.g., 524, 526, or 528, ... ), in accordance with the first type of subscription. Conversely, when the data, associated communication device (e.g., 506, 508, or 510, ... ), or associated user is associated with the second type of subscription (e.g., when the user or device has the second type of subscription), data communicated by the communication device to the RAN (e.g., 512, 514, or 516, ... ) can be routed to the core network 502, in accordance with the second type of subscription.

When data is communicated by a communication device (e.g., 506, 508, or 510, ... ) to the associated RAN (e.g., 512, 514, or 516, ... ), the RAN can process (e.g., analyze) the data, and, based at least in part on the results of the analysis, can determine the characteristics or type(s) of the data and/or the characteristics or type of communication device. The RAN (e.g., 512, 514, or 516, ... ) also can determine whether the data is to be routed (e.g., forwarded) to the associated MEC component (e.g., 524, 526, or 528, ... ) based at least in part on the characteristics or type(s) of the data and/or the characteristics or type of the communication device that sent the data, in accordance with the defined data management criteria and/or the information or instructions (e.g., routing information or instructions) received from the MEC component.

When it is determined that the data from the communication device (e.g., 506, 508, or 510, ... ) is not to be communicated or routed to the MEC component (e.g., 524, 526, or 528, ... ), the RAN (e.g., 512, 514, or 516, ... ) can communicate or route the data to the core network 502 for processing and communication by the core network 502. If, however, it is determined that the data from the communication device (e.g., 506, 508, or 510, ... ) is to be communicated or routed to the MEC component (e.g., 524, 526, or 528, ... ) that is associated with the RAN (e.g., 512, 514, or 516, ... ), the RAN can communicate or route the data to the MEC component, wherein the gateway component (e.g., 530, 532, or 534, ... ) of the MEC component can receive the data. The CMC (e.g., 542, 544, or 546, ... ) of the device platform (e.g., 536, 538, or 540, ... ), which is associated with the gateway component (e.g., 530, 532, or 534, ... ), can analyze the data and/or associated metadata. Based at least in part on the results of the analysis of the data and/or associated metadata, the CMC can determine various characteristics associated with the first device (e.g., device type of the first device, communication protocol utilized by the first device, and data payload format utilized by the first device), based at least in part on the defined data management criteria, such as more fully described herein. Also, based at least in part on the results of analyzing the data, the CMC (e.g., 542, 544, or 546, ... ) can determine whether any, all, or a portion of the data, and/or other data (e.g., an average value of the data, or of a portion thereof) derived from the data, is to be communicated (e.g., forwarded) to the intended receiving communication device (e.g., 518, 520, or 522), which can be associated with the communication network 504 or core network 502, in accordance with the defined data management criteria, such as more fully described herein. If it is determined that any, all, or a portion of the data, and/or other data (e.g., an average value of the data, or of a portion thereof) derived from the data, is to be communicated to the intended receiving communication device (e.g., 518, 520, or 522), such data can be communicated by the associated gateway component (e.g., 530, 532, or 534, ... ) and/or another component of the MEC component (e.g., 524, 526, or 528, ... ) to the communication network 504 or core network 502 with which the intended receiving communication device (e.g., 518, 520, or 522) is connected, wherein the MEC component can be associated with (e.g., communicatively connected to or interfaced with) the communication network 504 or core network 502. If it is determined that none of the data is to be communicated to the intended receiving communication device (e.g., 518, 520, or 522), the CMC (e.g., 542, 544, or 546, ... ) can handle the data (e.g., store all or a portion of the data in a data store, discard all or a portion of the data, or perform another action with regard to the data), in accordance with the defined data management criteria, as more fully described herein.

It is to be appreciated and understood that, while the system 500 of FIG. 5 depicts three MEC components, three device platforms, three sending communication devices, three receiving communication devices, three RANs, etc., the disclosed subject matter is not so limited, and, in accordance with various embodiments, the disclosed subject matter can have less than three, three, or more than three of each of MEC components, device platforms, sending communication devices, receiving communication devices, RANs, etc.

Figure 6:
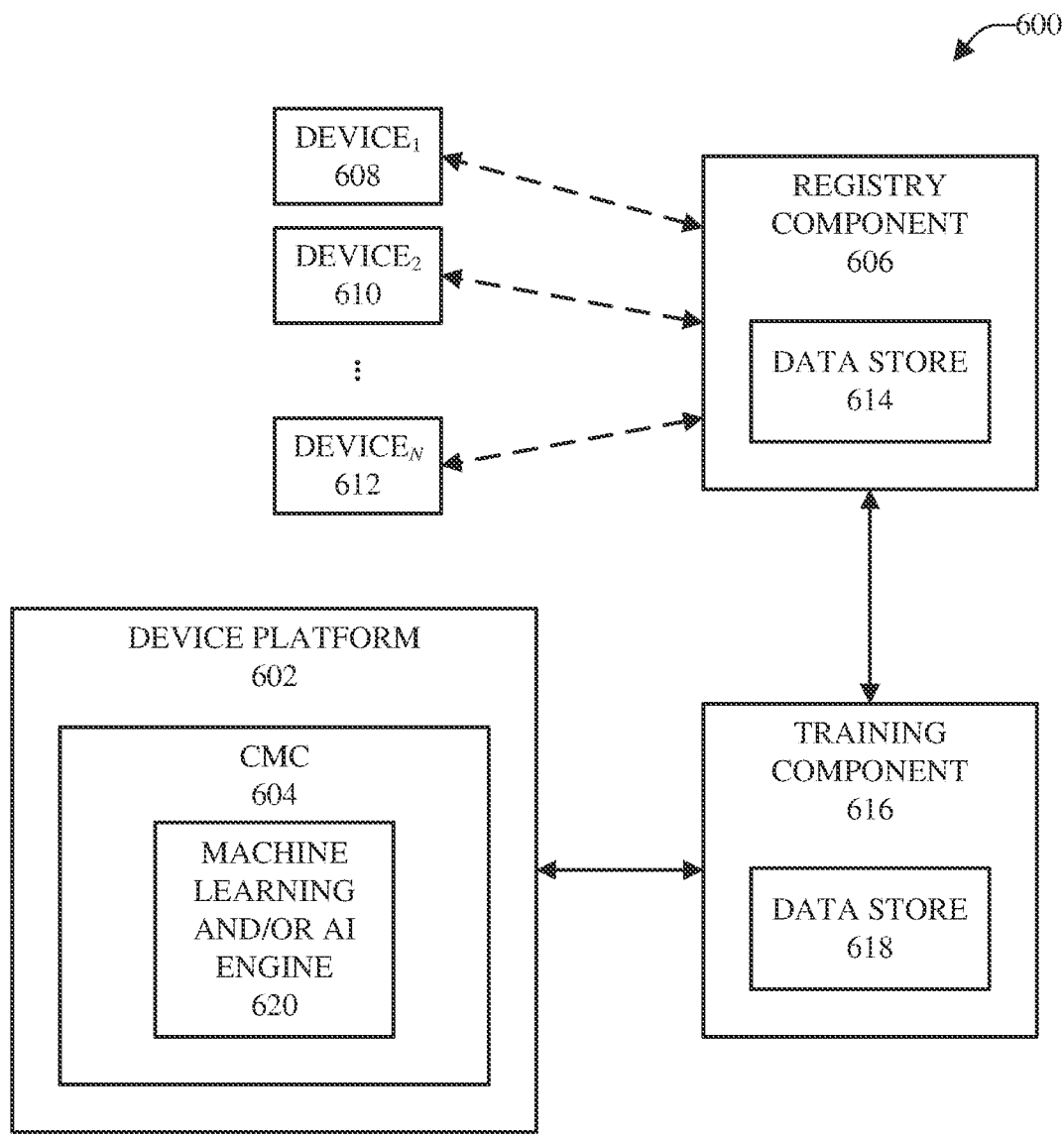
FIG. 6 illustrates a block diagram of an example, non-limiting system that can employ a training component to train a device platform to facilitate enabling the device platform to manage communication of data associated with a core network to facilitate desirable and efficient communication of information between devices associated with the core network or an associated communication network, in accordance with various aspects and embodiments of the disclosed subject matter.

Turning to FIG. 6, FIG. 6 illustrates a block diagram of an example, non-limiting system 600 that can employ a training component to train a device platform to facilitate enabling the device platform to manage communication of data associated with a core network to facilitate desirable and efficient communication of information between devices associated with the core network or an associated communication network, in accordance with various aspects and embodiments of the disclosed subject matter. The system 600 can comprise a device platform 602 (e.g., IoT platform), which can comprise a CMC 604. The device platform 602, employing the CMC 604, can manage data communications with regard to data received from devices associated with (e.g., communicatively connected to) a core network, in accordance with defined data management criteria, as more fully described herein.

In some embodiments, the system 600 can include a registry component 606 that can be utilized to register various types of communication devices (e.g., IoT devices or other types of communication devices), including, for example, device$_1$ 608, device$_2$ 610, up through device$_N$ 612, wherein N can be virtually any desired number. The registry component 606 can receive respective information, including information relating to respective characteristics, regarding the respective devices (e.g., 608, 610, 612, ... ) from the respective devices or from another communication device. With regard to each device (e.g., 608, 610, 612, . . . ), the information can comprise, for example, information regarding the device type of a device, information regarding a communication protocol(s) that can be utilized by the device, information regarding a data payload format(s) that can be utilized by the device, device identifier information (e.g., device ID, MAC address, or serial number, . . . ) that can identify the device, manufacturer information that can specify or indicate the manufacturer of the device, model information that can specify or indicate the model, version information that can specify or indicate the version of the operating system, version of a communication protocol, version of firmware, and/or version of software utilized by the device, functionality information that can specify or indicate functionalities or features of the device, and/or other information regarding other characteristics of or associated with the device. The registry component 606 can store the respective information regarding the respective devices (e.g., 608, 610, 612, . . . ) in a data store 614 of or associated with the registry component 606.

The system 600 also can comprise a training component 616 that can be associated with (e.g., communicatively connected to) the device platform 602. In some embodiments, the training component 616 can be associated with (e.g., directly or indirectly connected to or otherwise associated with) the registry component 606. The training component 616 can generate or receive training data relating to respective characteristics associated with respective devices, such as devices 608, 610, and 612, wherein the training data can be utilized to facilitate training the device platform 602. For instance, the training component 616 can receive information, including characteristics information, regarding various types of devices from one or more data sources (e.g., the registry component 606, or communication devices associated with device manufacturers, . . . ). The training component 616 can generate training data based at least in part on such information, including the characteristics information. In some embodiments, the training component 616 can generate all or a portion of the training data based at least in part on the information, including the information relating to the respective characteristics of the respective devices (e.g., 608, 610, 612, . . . ), obtained from the registry component 606. The training component 616 can comprise or be associated with a data store 618 that can store the training data. The training data can be utilized to train the device platform 602 to identify, determine, and/or distinguish between respective characteristics of respective devices to facilitate data management associated with devices (e.g., 608, 610, 612, . . . ). In certain embodiments, the training component 616 can determine or generate a mapping of respective characteristics to respective types of devices, wherein the mapping can be part of the training data.

In some embodiments, the CMC 604 can comprise or be associated with a machine learning and/or AI engine 620 that can employ one or more desired machine learning and/or AI techniques that can enable the machine learning and/or AI engine 620, and thus, the CMC 604 to learn respective characteristics of or associated with various types of devices (e.g., 608, 610, 612, . . . ). The training component 616 can apply the training data to the machine learning and/or AI engine 620, and the machine learning and/or AI engine 620 can be trained to identify, determine, and/or distinguish between respective characteristics of respective devices (e.g., respective types of devices) based at least in part on the application of the training data.

The training of the machine learning and/or AI engine 620 can include the training component 616 applying initial training data to the machine learning and/or AI engine 620 and/or applying supplemental training data to the machine learning and/or AI engine 620 during one or more supplemental training sessions. For instance, as new types of devices (e.g., IoT devices or other types of communication devices) are introduced and/or certain devices are updated (e.g., firmware update, software update, or hardware update, . . . ), the training component 616 can generate or obtain supplemental training data regarding such new types of devices and/or updates to such certain devices. The training component 616 can apply the supplemental training data to the machine learning and/or AI engine 620 to supplement or refine the training, learning, and/or knowledge of the machine learning and/or AI engine 620.

In some embodiments, the machine learning and/or AI engine 620 also can learn or train itself on its own based at least in part on data and/or metadata that the machine learning and/or AI engine 620 analyzes and processes in connection with the data and/or metadata received from devices communicating data via the core network. For instance, after being trained by the training component 616 or in between training sessions by the training component 616, the machine learning and/or AI engine 620 can continue to learn, be trained, or increase its knowledge regarding characteristics of or associated with devices to refine (e.g., enhance or improve) the ability of the machine learning and/or AI engine 620 to identify, determine, and/or distinguish between respective characteristics of respective devices (e.g., respective types of devices). In accordance with various embodiments, the machine learning and/or AI engine 620 can receive the mapping of respective characteristics to respective types of devices from the training component 616, and can be trained based at least in part on the mapping, and/or the machine learning and/or AI engine 620 can generate a mapping of respective characteristics to respective types of devices based at least in part the training data and/or other data received by the machine learning and/or AI engine 620.

Based at least in part on the training of the machine learning and/or AI engine 620, the CMC 604 can determine respective characteristics of the respective devices to facilitate data management of data communicated by the respective devices via the core network, in accordance with the defined data management criteria. The respective characteristics can comprise respective device types of respective devices, respective communication protocols of respective devices, respective data payload formats of respective devices, and/or other respective characteristics of respective devices. For example, based at least in part on the training of the machine learning and/or AI engine 620 and the results of analyzing metadata and/or data received from a device communicating data to the core network, the CMC 604 can determine the device type of the device, the communication protocol utilized by the device, the data payload format utilized by the device, and/or another characteristic(s) associated with the device.

Figure 7:
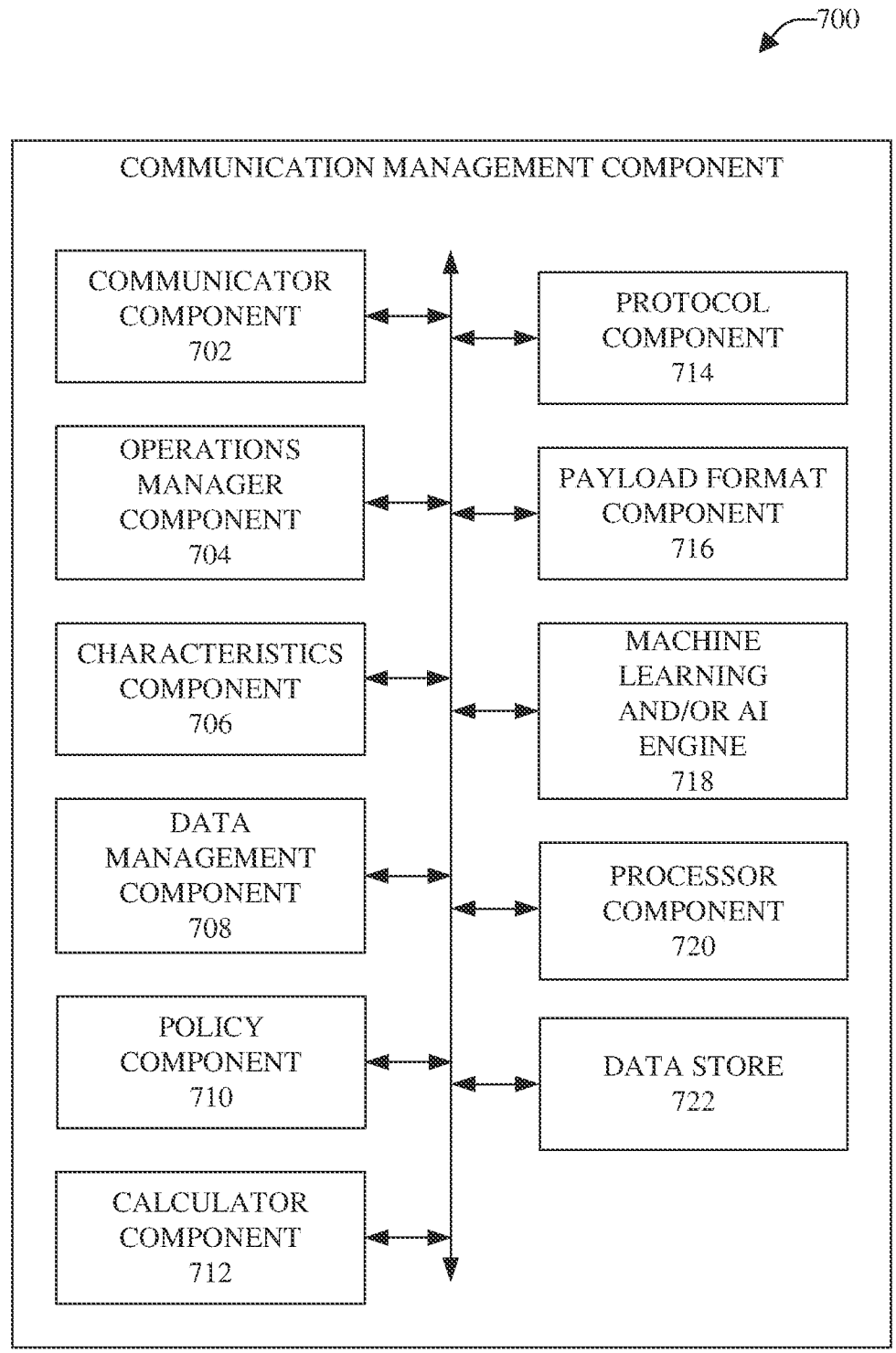
FIG. 7 presents a block diagram of example, non-limiting communication management component, in accordance with various aspects and embodiments of the disclosed subject matter.

FIG. 7 depicts a block diagram of an example, non-limiting CMC 700, in accordance with various aspects and embodiments of the disclosed subject matter. The CMC 700 can comprise a communicator component 702 that can communicate or facilitate communication of information to devices or components (e.g., communicating data to communication devices associated with the core network, communicating data to the communication network for forwarding to communication devices, or communicating data to a network component of the core network, . . . ), and can receive information from the other devices or components (e.g., receiving data received from communication devices, receiving training data from the training component, or receiving policy rules from the policy engine, . . . ).

The CMC 700 also can include an operations manager component 704 that can control (e.g., manage) operations associated with the CMC 700. For example, the operations manager component 704 can facilitate generating instructions to have components of or associated with the CMC 700 perform operations, and can communicate respective instructions to respective components (e.g., communicator component 702, characteristics component 706, data management component 708, policy component 710, . . . ) of or associated with the CMC 700 to facilitate performance of operations by the respective components of or associated with the CMC 700 based at least in part on the instructions, in accordance with the defined data management criteria and the defined data management algorithm(s) (e.g., data management algorithms as disclosed, defined, recited, or indicated herein by the methods, systems, and techniques described herein). The operations manager component 704 also can facilitate controlling data flow between the respective components of the CMC 700 and controlling data flow between the CMC 700 and another component(s) or device(s) (e.g., devices or components of the core network) associated with (e.g., connected to) the CMC 700.

The CMC 700 can comprise a characteristics component 706 that can determine characteristics of or associated with a device (e.g., IoT device or other type of communication device) from which data is received based at least in part on the results of analyzing the data and/or metadata received from the device and the training of the CMC 700, in accordance with the defined data management criteria. For instance, the characteristics component 706 can analyze the data and/or metadata received from the device, and based at least in part on the analysis, can determine the device type of the device, the communication protocol utilized by the device, the data payload format utilized the device, and/or another characteristic(s) of or associated with the device.

The CMC 700 can include a data management component 708 that can manage communication of data received from devices associated with the core network. The data management component 708 can analyze data and/or associated metadata received from a device associated with the core network, wherein the data can be intended to be sent to an intended receiving device associated with a communication network or the core network. The data management component 708 can determine whether any, all, or a portion of the data, and/or other data that can be derived from the data (e.g., calculated based on the data), is to be communicated to an intended receiving device associated with the communication network or core network based at least in part on the results of the analysis and the defined data management criteria (e.g., applicable data management criteria) (and corresponding policy rules). In response to determining that all of the data, a portion of the data, and/or the other data is to be communicated to the intended receiving device, the data management component 708, in conjunction with the communicator component 702, can communicate or facilitate communicating all of the data, the portion of the data, and/or the other data to the intended receiving device. In response to determining that none of the data (and no other data) is to be communicated to the intended receiving device, the data management component 708 can operate to not send any of the data (and the other data) to the intended receiving device, and can discard the data or maintain the data (e.g., store the data in a data store), in accordance with the defined data management criteria.

The CMC 700 also can comprise a policy component 710 that can determine, generate, receive, and/or enforce policy rules that can be applied to data received from a device to facilitate determining whether any, all, or a portion of the data, and/or other data that can be derived from the data, is to be communicated to an intended receiving device associated with the communication network or core network. The policy component 710, or another component (e.g., policy engine, such as a PCRF) of or associated with the CMC 700, can determine the policy rules based at least in part on the defined data management criteria and/or data management information received from the user of the device, an application, a service, and/or another entity (e.g., a service provider). The data management information can indicate what data (e.g., what types of data (or other data that can be derived from the data)) can be desired by the application, service, or other entity, conditions for communicating data to an intended receiving device (e.g., a particular threshold value for a particular data type that can indicate a threshold that is to be satisfied in order for the data of that data type to be sent to the intended receiving device, or a periodicity parameter that can indicate a periodicity or frequency for sending particular data of a particular data type to the intended receiving device). When data is being analyzed by the data management component 708, the data management component 708 or policy component 710 can apply the policy rules (e.g., a subset of policy rules that are determined to be applicable to the data or associated device(s) (e.g., sending device and/or intended receiving device)) to, and enforce the policy rules with respect to, the data to facilitate determining whether any, all, or a portion of the data, and/or the other data, is to be communicated to the intended receiving device.

In some embodiments, the CMC 700 can include a calculator component 712 that can determine or calculate certain data based at least in part on data received from a device and intended to be sent to an intended receiving device (e.g., device associated with an application, a service, or an entity) associated with the communication network or core network. For example, the data management component 708 can determine that temperature data received every minute from the device does not exceed a defined threshold temperature, based at least in part on the results of analyzing the data and the defined data management criteria. In accordance with the applicable data management criteria, when the temperature data is determined to not exceed the defined threshold temperature, an average (or median) temperature level is to be communicated to the intended receiving device every two hours. The calculator component 712 can determine or calculate the average (or median) temperature level based at least in part on (e.g., as a function of) the respective temperature levels indicated by the temperature data over a two-hour time period. The data management component 708 can determine that the average (or median) temperature level (e.g., other data derived from the data) is to be communicated to the intended receiving device, instead of the original temperature data received from the device, in accordance with the applicable data management criteria. The communicator component 702 can communicate the average (or median) temperature level to the intended receiving device.

The calculator component 712 can perform a variety of data determinations or calculations with regard to data. For instance, the calculator component 712 can determine or calculate an average or median data values for data (e.g., over a defined period of time), a maximum or peak data value, a minimum data value, a range of data values (e.g., maximum and minimum data values over a defined period of time), standard deviation of a set of data values, a summary of a set of data, trend data that can indicate a trend with regard to a set of data, and/or other desired data determinations or calculations.

The CMC 700 further can comprise a protocol component 714 that can identify a communication protocol that is to be utilized in connection with data (e.g., data packet) received from a device and intended to be sent to an intended receiving device, based at least in part on the characteristics component 706 determining the communication protocol associated with the data received from the device. The protocol component 714 also can structure a data communication and facilitate communication of data in accordance with that communication protocol. For instance, with regard to data (and associated metadata) received from a device and intended to be sent to an intended receiving device, based at least in part on the results of analyzing the metadata and/or data, the characteristics component 706 can determine that a particular communication protocol (e.g., MQTT) is to be utilized for data communications associated with the device and intended receiving device. The protocol component 714 can structure the data communication and facilitate communication of the data to the intended receiving device in accordance with the particular communication protocol. The protocol component 714 can facilitate structuring and performing data communications using a variety of communication protocols, including, for example, HTTP, HTTPS, MQTT protocol, M2M connectivity protocol, AMQP, LwM2M protocol, CoAP, UDP, TCP, IP, and/or other desired network-related communication protocols.

The CMC 700 also can include a payload format component 716 that can identify a data payload in data (e.g., data packet) received from a device in accordance with the data payload format employed by the device, based at least in part on the characteristics component 706 determining the data payload format associated with the data received from the device. The payload format component 716 also can structure or format a data payload of a data communication (e.g., a data packet) that is to be in accordance with data payload format associated with the device. For instance, with regard to data (and associated metadata) received from a device and intended to be sent to an intended receiving device, based at least in part on the results of analyzing the metadata and/or data, the characteristics component 706 can determine that a particular data payload format (e.g., hexadecimal) is to be utilized for data communications associated with the device and intended receiving device. The payload format component 716 can format data in a data communication (e.g., data packet) in accordance with the particular data payload format. The payload format component 716 can employ a variety of data payload formats, including, for example, binary format, hexadecimal format, decimal format, zoned decimal format, ASCII, XML, and/or other desired types of data payload formats.

In some embodiments, the CMC 700 can comprise a machine learning and/or AI engine 718 that can employ one or more desired machine learning and/or AI techniques and technologies that can enable the machine learning and/or AI engine 718, and thus, the CMC 700 to learn respective characteristics of or associated with various types of devices (e.g., IoT devices or other types of communication devices), as more fully described herein. The machine learning and/or AI engine 718 can be trained to learn to identify, determine, or distinguish between respective (e.g., different) characteristics of respective devices (e.g., respective types of devices) based at least in part on training of (e.g., application of training data to) the machine learning and/or AI engine 718 and the one or more desired machine learning and/or AI techniques and technologies. The training of the machine learning and/or AI engine 718 can comprise initial training of the machine learning and/or AI engine 718 and/or subsequent training of the machine learning and/or AI engine 718, wherein the subsequent training of the machine learning and/or AI engine 718 can supplement or refine the training, learning, and/or knowledge of the machine learning and/or AI engine 718. In some embodiments, the machine learning and/or AI engine 718 also can learn or train itself on its own based at least in part on data and/or metadata that the machine learning and/or AI engine 718 analyzes and processes in connection with the data and/or metadata received from devices communicating data via the core network, as more fully described herein.

The CMC 700 also can comprise a processor component 720 can work in conjunction with the other components (e.g., communicator component 702, operations manager component 704, characteristics component 706, data management component 708, . . . , and data store 722) to facilitate performing the various functions of the CMC 700. The processor component 720 can employ one or more processors, microprocessors, or controllers that can process data, such as information relating to data communications (e.g., data, such as data packets, received from devices), metadata, communication devices (e.g., characteristics of or associated with communication devices), device types of devices, communication protocols, data payload formats, policies and rules, users, applications, services, machine learning techniques and technologies, AI techniques and technologies, data management criteria, traffic flows, signaling, algorithms (e.g., data management algorithm(s), mapping algorithm(s), . . . ), protocols, interfaces, tools, and/or other information, to facilitate operation of the CMC 700, as more fully disclosed herein, and control data flow between the CMC 700 and other components (e.g., network components of the core network, communication devices, applications, . . . ) associated with the CMC 700.

The data store 722 can store data structures (e.g., user data, metadata), code structure(s) (e.g., modules, objects, hashes, classes, procedures) or instructions, information relating to data communications (e.g., data, such as data packets, received from devices), metadata, communication devices (e.g., characteristics of or associated with communication devices), device types of devices, communication protocols, data payload formats, policies and rules, users, applications, services, machine learning techniques and technologies, AI techniques and technologies, data management criteria, traffic flows, signaling, algorithms (e.g., data management algorithm(s), mapping algorithm(s), . . . ), protocols, interfaces, tools, and/or other information, to facilitate controlling operations associated with the CMC 700. In an aspect, the processor component 720 can be functionally coupled (e.g., through a memory bus) to the data store 722 in order to store and retrieve information desired to operate and/or confer functionality, at least in part, to the communicator component 702, operations manager component 704, characteristics component 706, data management component 708, policy component 710, calculator component 712, protocol component 714, payload format component 716, machine learning and/or AI engine 718, and data store 722, etc., and/or substantially any other operational aspects of the CMC 700.

It should be appreciated that the data store 722 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
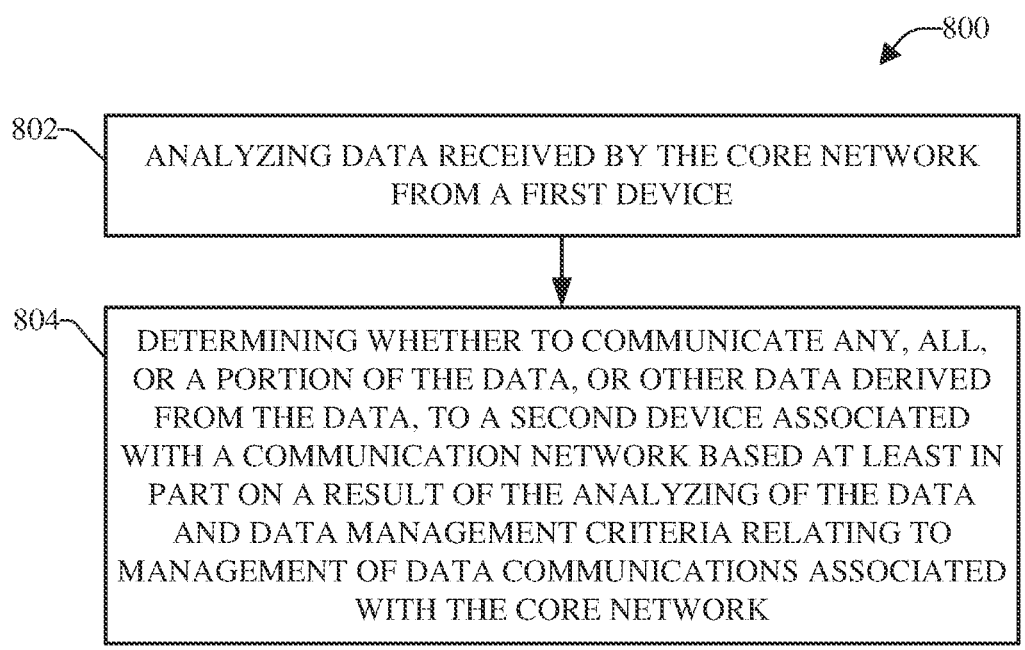
FIG. 8 illustrates a flow diagram of an example, non-limiting method that can manage communication of data associated with a core network to facilitate desirable and efficient communication of information between devices associated with the core network or an associated communication network, in accordance with various aspects and embodiments of the disclosed subject matter.
Figure 9:
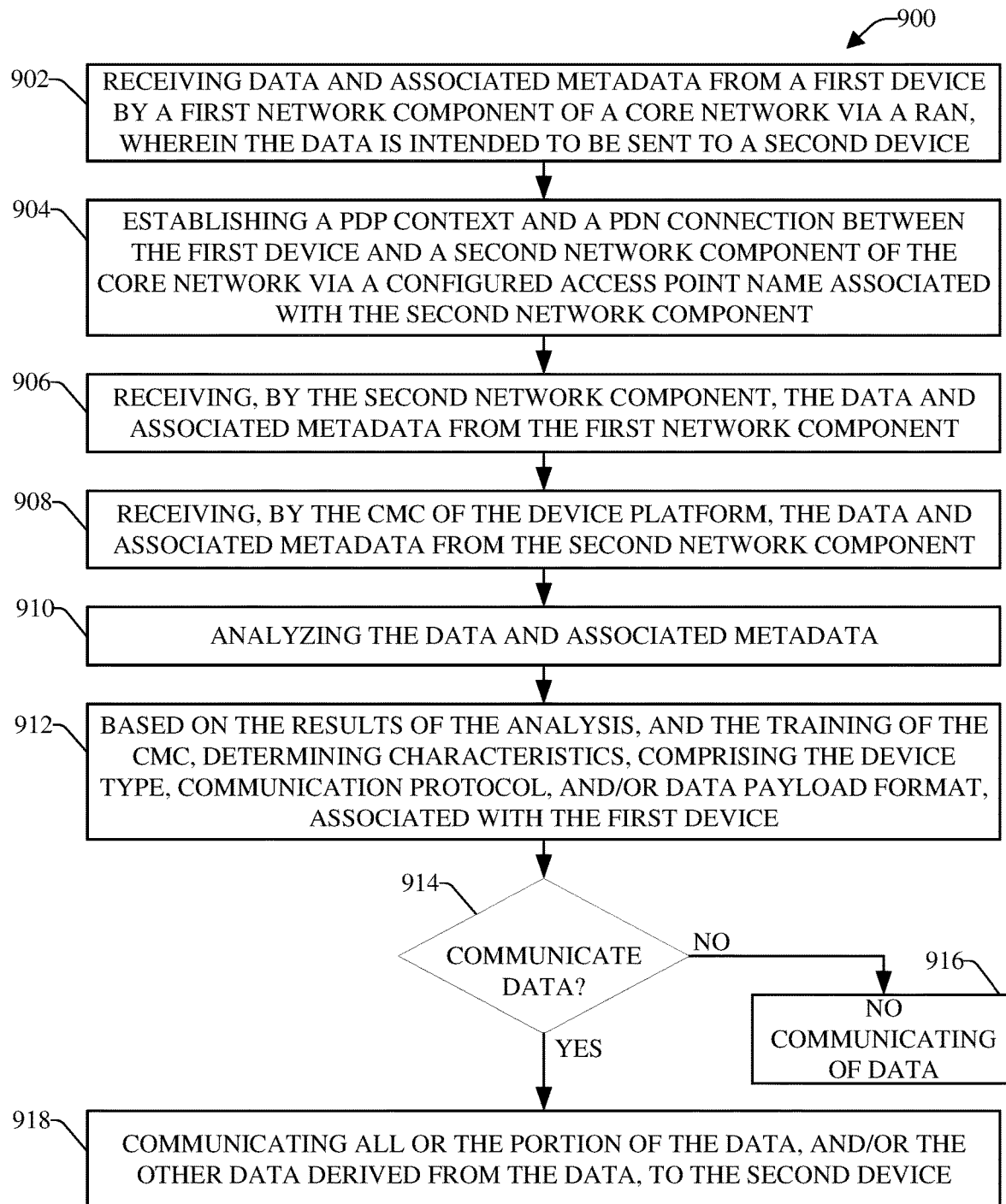
FIG. 9 depicts a flow diagram of another example, non-limiting method that can manage communication of data associated with a core network to facilitate desirable and efficient communication of information between devices associated with the core network or an associated communication network, in accordance with various aspects and embodiments of the disclosed subject matter.
Figure 10:
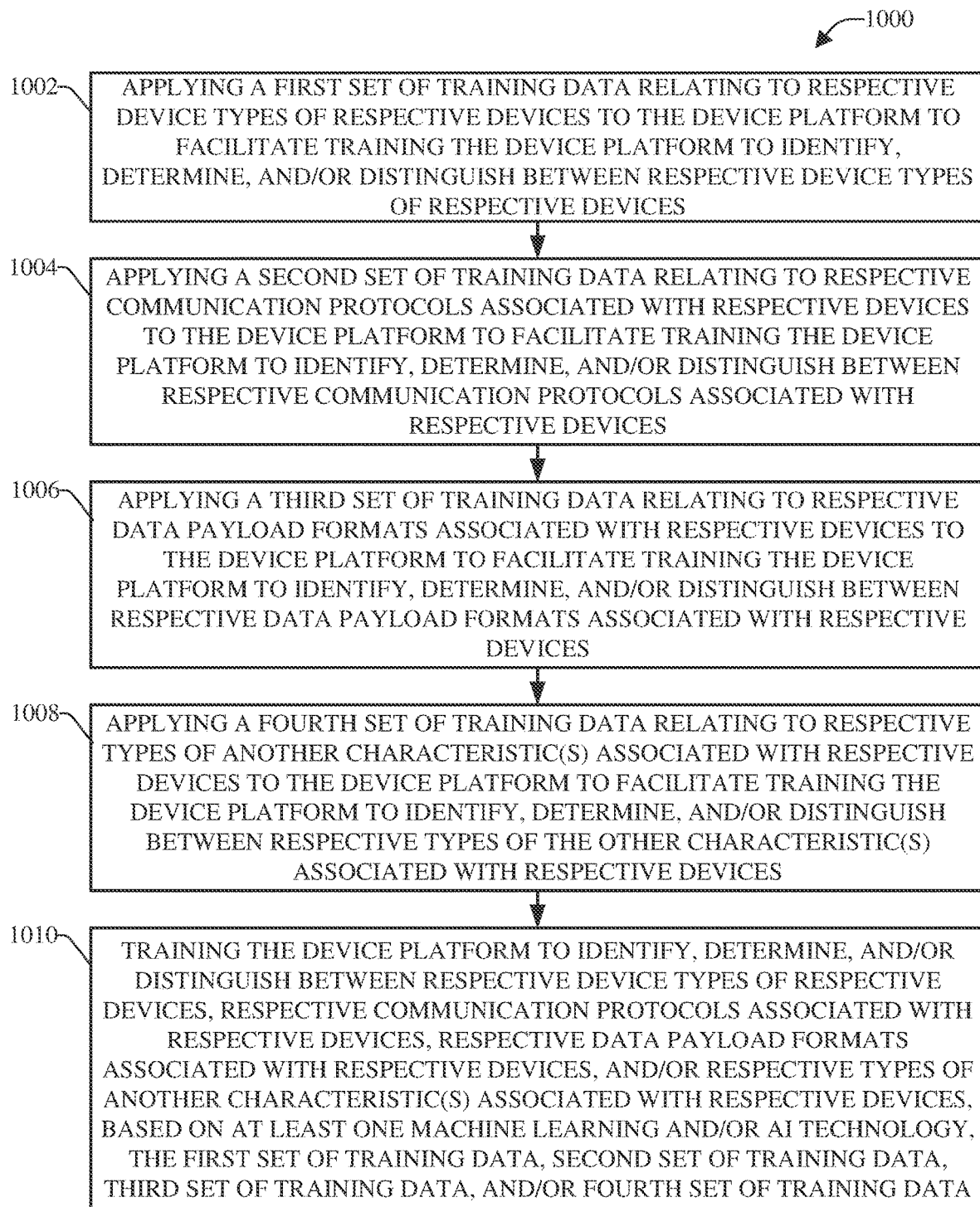
FIG. 10 illustrates a flow diagram of an example, non-limiting method that can train a device platform integrated with a core network to facilitate managing communication of data associated with the core network to facilitate desirable and efficient communication of information between devices associated with the core network or an associated communication network, in accordance with various aspects and embodiments of the disclosed subject matter.

In view of the example systems and/or devices described herein, example methods that can be implemented in accordance with the disclosed subject matter can be further appreciated with reference to flowchart in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow diagram of an example, non-limiting method 800 that can manage communication of data associated with a core network to facilitate desirable and efficient communication of information between devices associated with the core network or an associated communication network, in accordance with various aspects and embodiments of the disclosed subject matter. The method 800 can be implemented by a CMC (e.g., CMC that can be part of the device platform (e.g., IoT platform) in the core network), processor component, data store, and/or another component(s). Alternatively, or additionally, a machine-readable storage medium can comprise executable instructions that, when executed by a processor, facilitate performance of operations for the method 800.

At 802, data received by the core network from a first device can be analyzed. The core network can comprise a device platform that can be associated with or part of (e.g., co-located with) a gateway component (e.g., a PGW or GGSN) of the core network. The core network can receive the data and associated metadata (e.g., device identifier information) from the first device via a RAN (e.g., via a base station of a RAN). For instance, a network component (e.g., SGW component) of the core network can receive the data and associated metadata from the first device via the RAN. The gateway component can receive the data and associated metadata from the network component. The device platform can receive the data and associated metadata by or at the gateway component. The device platform can comprise the CMC. The CMC can analyze the data and associated metadata.

At 804, a determination can be made regarding whether to communicate any, all, or a portion of the data, or other data derived from the data, to a second device associated with a communication network based at least in part on a result of the analyzing of the data and data management criteria relating to management of data communications associated with the core network, wherein the core network can be associated with the communication network. Based at least in part on the results of analyzing the data and/or metadata, and the data management criteria (e.g., applicable data management criterion or criteria), the CMC can determine whether to communicate the data (and/or other data derived from the data), a portion of the data (and/or a portion of other data derived from the data), no data, or other data derived or determined from the data, to the second device associated with the communication network. The applicable data management criteria can comprise or relate to a threshold value and/or a periodicity parameter relating to the type of data, or to the application or service to which the data is directed, wherein the threshold value can relate to a relative level of importance of the data (e.g., an item of data that satisfies the applicable threshold value is to be communicated to the second device), and wherein the periodicity parameter can indicate a frequency, a time period, or a desired length of time between communication of respective items of data (e.g., periodically communicate certain data (e.g., certain types or items of data) to the second device, in accordance with the periodicity parameter).

In response to determining that no data received from the first device is to be communicated (e.g., forwarded) to the second device based at least in part on the analysis results and the applicable data management criteria, the CMC can prevent the data from being communicated to the second device and/or can discard the data. In response to determining that all or a portion of the data received from the first device, and/or other data derived from the data, is to be communicated (e.g., forwarded) to the second device based at least in part on the analysis results and the applicable data management criteria, the CMC can communicate all or the portion of the data, and/or the other data derived from the data, from the core network, via the communication network (e.g., via one or more network components of the communication network), to the second device.

FIG. 9 depicts a flow diagram of another example, non-limiting method 900 that can manage communication of data associated with a core network to facilitate desirable and efficient communication of information between devices associated with the core network or an associated communication network, in accordance with various aspects and embodiments of the disclosed subject matter. The method 900 can be implemented by a CMC (e.g., CMC that can be part of the device platform in the core network), processor component, data store, and/or another component(s). Alternatively, or additionally, a machine-readable storage medium can comprise executable instructions that, when executed by a processor, facilitate performance of operations for the method 900.

At 902, data and associated metadata can be received from a first device by a first network component of a core network via a RAN, wherein the data is intended to be sent to a second device associated with a communication network or the core network. The first network component (e.g., SGW) can receive the data and associated metadata (e.g., device identifier information) from the first device via a base station of the RAN. The data can be intended to be communicated to the second device, which can be associated with the communication network (e.g., associated with the core network) or the core network, wherein the second device can be associated with an application, a service, and/or an entity.

At 904, a PDP context and a PDN connection between the first device and a second network component of the core network can be established via a configured access point name associated with the second network component. The second network component (e.g., PGW or GGSN) of the core network can establish or facilitate establishing the PDP context and the PDN connection between the first device and the second network component via the configured access point name associated with (e.g., hosted on) the second network component.

At 906, the second network component can receive the data and associated metadata from the first network component. The first network component can communicate (e.g., forward or route) the data and associated metadata, which was received from the first device, to the second network component.

At 908, the CMC of the device platform can receive the data and associated metadata from the second network component. The device platform (e.g., IoT platform) can be co-located with (e.g., part of) or in proximity to (e.g., adjacent to; physically and/or logically in proximity to) the second network component. The second network component can communicate (e.g., forward or route) the data and associated metadata to the CMC.

At 910, the data and associated metadata can be analyzed. The CMC can analyze the data and associated metadata to facilitate determining characteristics associated with the first device and/or the data or associated metadata, and to facilitate determining whether any, all, or a portion of the data, and/or other data derived from the data, is to be communicated to the second device. The metadata can comprise information relating to the data, the first device, and/or the second device. For example, the metadata can comprise device identifier information (e.g., a device ID, a MAC address, a serial number, or other identifying information that can identify the first device). The CMC can be trained to determine characteristics (e.g., device type, communication protocol, and/or data payload format, . . . ) associated with devices, as more fully described herein.

At 912, based at least in part on the results of the analysis, and the training of the CMC, characteristics, comprising the device type, communication protocol, and/or data payload format, associated with the first device can be determined. The CMC can determine characteristics, comprising the device type, communication protocol, and/or data payload format, associated with the first device, based at least in part on the results of the analysis, and the training of the CMC.

At 914, a determination can be made regarding whether to communicate any, all, or a portion of the data, and/or other data derived from the data, to the second device based at least in part on the results of the analyzing of the data, the associated metadata, and/or data management criteria relating to management of data communications associated with the core network. Based at least in part on the results of analyzing the data and/or associated metadata, and the data management criteria (e.g., applicable data management criterion or criteria), the CMC can determine whether to communicate the data (and/or other data derived from the data), a portion of the data (and/or a portion of other data derived from the data), or none of the data to the second device associated with the communication network or core network. The applicable data management criteria can comprise or relate to, for example, a threshold value and/or a periodicity parameter relating to the type of data, or relating to the application or service to which the data is directed. The threshold value can relate to, for example, a relative level of importance of the data (e.g., an item of data that satisfies the applicable threshold value can be communicated to the second device). The periodicity parameter can, for example, indicate a frequency, a time period, or a desired length of time between communication of respective items of data (e.g., periodically communicate certain data (e.g., certain types or items of data) to the second device, in accordance with the periodicity parameter).

In response to determining that none of the data is to be communicated to the second device, at 916, none of the data is communicated to the second device. The CMC can decide to not communicate any of the data to the second device and/or can discard the data, in response to determining that none of the data is to be communicated to the second device.

If, at 914, it is determined that all or a portion of the data, and/or other data derived from the data, is to be communicated to the second device, at 918, all or the portion of the data, and/or the other data derived from the data, can be communicated to the second device. In response to determining that all or the portion of the data, and/or the other data derived from the data, is to be communicated to the second device, the CMC can communicate, initiate communicating, or facilitate communicating all or the portion of the data, and/or the other data derived from the data, to the second device. For instance, the CMC can communicate (e.g., forward, route, or send), initiate communicating, or facilitate communicating all or the portion of the data, and/or the other data derived from the data, to a network device of the communication network, if the second device is associated with (e.g., communicatively connected to) the communication network, or to a network device of the core network, if the second device is associated with (e.g., communicatively connected to) the core network.

FIG. 10 illustrates a flow diagram of an example, non-limiting method 1000 that can train a device platform (e.g., IoT platform) integrated with a core network to facilitate managing communication of data associated with the core network to facilitate desirable and efficient communication of information between devices associated with the core network or an associated communication network, in accordance with various aspects and embodiments of the disclosed subject matter. The method 1000 can be implemented using a CMC (e.g., CMC that can be part of the device platform in the core network), training component, processor component, data store, and/or another component(s). Alternatively, or additionally, a machine-readable storage medium can comprise executable instructions that, when executed by a processor, facilitate performance of operations for the method 1000.

At 1002, a first set of training data relating to respective device types of respective devices can be applied to the device platform to facilitate training the device platform to identify, determine, and/or distinguish between respective device types of respective devices. The training component can apply the first set of training data, which can relate to respective device types of respective devices, to the device platform (e.g., the CMC of the device platform) to facilitate training the device platform (e.g., training the CMC) to identify, determine, and/or distinguish between respective (e.g., different) device types of respective devices. The first set of training data can comprise information regarding device IDs, serial numbers, or other device identifying information of respective devices, respective device types (e.g., temperature sensing device, heart monitor device, blood sugar monitor device, music/media player device, drone, and/or appliance, . . . ) of respective devices, and/or other desired information relating to device types of devices.

At 1004, a second set of training data relating to respective communication protocols associated with respective devices can be applied to the device platform to facilitate training the device platform to identify, determine, and/or distinguish between respective communication protocols associated with respective devices. The training component can apply the second set of training data, which can relate to respective communication protocols associated with (e.g., utilized by) respective devices, to the device platform (e.g., the CMC of the device platform) to facilitate training the device platform (e.g., training the CMC) to identify, determine, and/or distinguish between respective (e.g., different) communication protocols associated with respective devices. The second set of training data can comprise information relating to, for example, HTTP, HTTPS, MQTT protocol, M2M connectivity protocol, AMQP, LwM2M protocol, CoAP, UDP, TCP, IP, and/or other desired network-related communication protocols, and information indicating respective communication protocols that can be utilized by the respective devices.

At 1006, a third set of training data relating to respective data payload formats associated with respective devices can be applied to the device platform to facilitate training the device platform to identify, determine, and/or distinguish between respective data payload formats associated with respective devices. The training component can apply the third set of training data, which can relate to respective data payload formats associated with (e.g., utilized by) respective devices, to the device platform (e.g., the CMC of the device platform) to facilitate training the device platform (e.g., training the CMC) to identify, determine, and/or distinguish between respective (e.g., different) data payload formats associated with respective devices. The third set of training data can comprise information regarding, for example, binary format, hexadecimal format, decimal format, zoned decimal format, ASCII, XML, and/or other desired types of data payload formats, and information indicating respective data payload formats that can be utilized by the respective devices.

At 1008, a fourth set of training data relating to respective types of another characteristic(s) associated with respective devices can be applied to the device platform to facilitate training the device platform to identify, determine, and/or distinguish between respective types of the other characteristic(s) associated with respective devices. The training component can apply the fourth set of training data, which can relate to respective types of the other characteristic(s) associated with respective devices, to the device platform (e.g., the CMC of the device platform) to facilitate training the device platform (e.g., training the CMC) to identify, determine, and/or distinguish between respective (e.g., different) types of the other characteristic(s) associated with respective devices.

At 1010, the device platform can be trained to identify, determine, and/or distinguish between respective device types of respective devices, respective communication protocols associated with respective devices, respective data payload formats associated with respective devices, and/or respective types of another characteristic(s) associated with respective devices, based at least in part on at least one machine learning and/or AI technology, the first set of training data, the second set of training data, the third set of training data, and/or the fourth set of training data. The training component can train the device platform (and associated CMC) to identify, determine, and/or distinguish between respective device types of respective devices, respective communication protocols associated with respective devices, respective data payload formats associated with respective devices, and/or respective types of another characteristic(s) associated with respective devices, based at least in part on at least one machine learning and/or AI technology (and/or machine learning and/or AI application), the first set of training data, the second set of training data, the third set of training data, and/or the fourth set of training data. It is to be appreciated and understood that the training of the device platform (and associated CMC) can comprise initial training of the device platform (and associated CMC), and subsequent training of the device platform (and associated CMC), either from training data applied to the device platform (and associated CMC) or from other data (e.g., data and/or metadata communicated by devices to the core network) processed and/or analyzed by the device platform (and associated CMC).

Described herein are systems, methods, articles of manufacture, and other embodiments or implementations that can facilitate managing communication of data received from devices (e.g., IoT devices or other communication devices) associated with a core network, determining characteristics (e.g., device type, communication protocol, and/or data payload format, . . . ) associated with a device or data received from the device, training a device platform (e.g., training a machine learning and/or AI engine of the device platform), and/or performing other operations (e.g., operations of or associated with the device platform) in connection with managing the communication of data received from the devices associated with the core network. The managing communication of data received from devices, determining the characteristics associated with a device or data received from the device, and/or training of the device platform, and/or other features of the disclosed subject matter, can be implemented in connection with any type of device with a connection to the core network or communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 11:
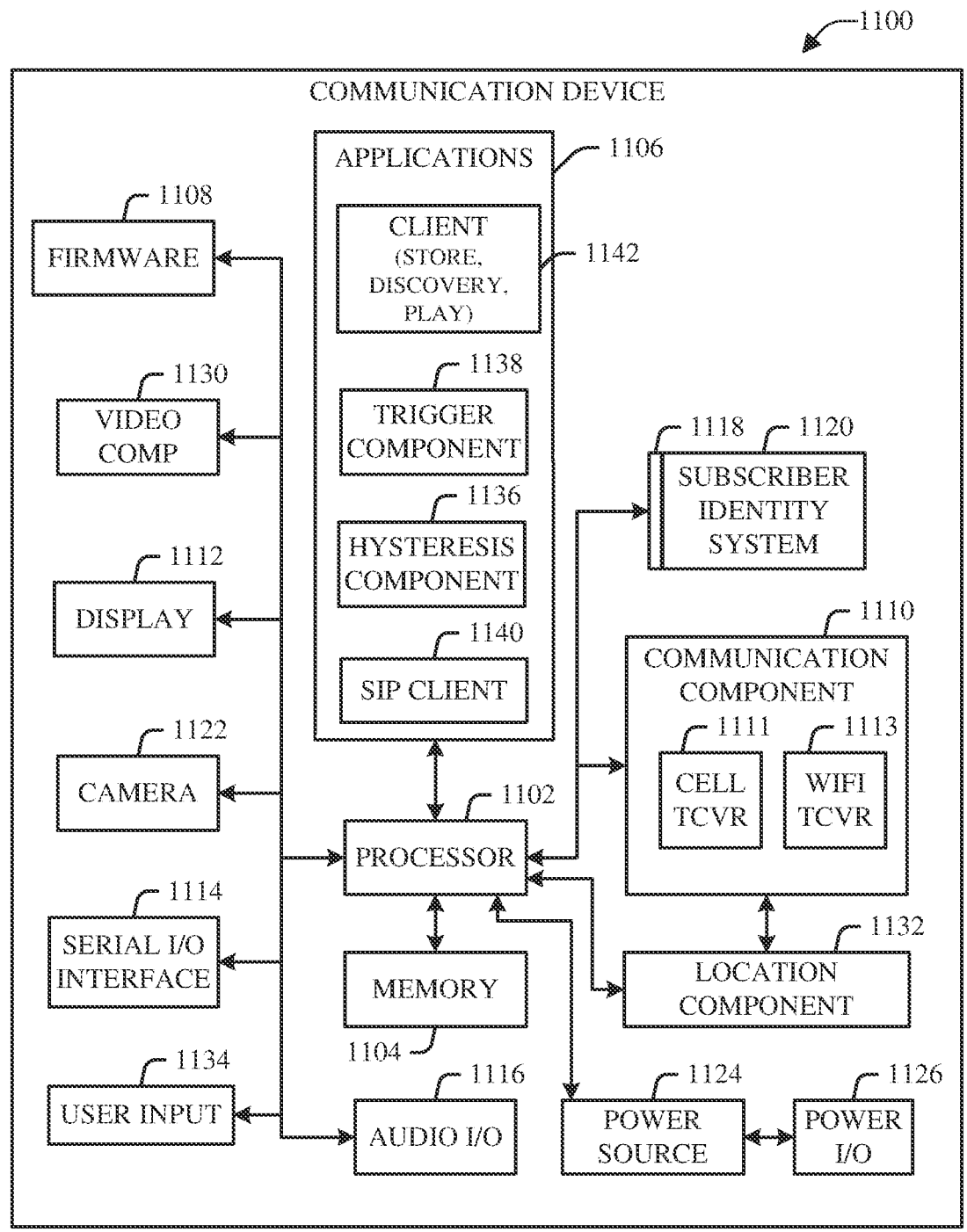
FIG. 11 depicts an example block diagram of an example communication device operable to engage in a system architecture that facilitates wireless communications according to one or more embodiments described herein.

Referring now to FIG. 11, depicted is an example block diagram of an example communication device 1100 (e.g., wireless phone, IoT device, etc.) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 1100 can include a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the communication device 1100. A communication component 1110 interfaces to the processor 1102 to facilitate wired/wireless communication with external systems, e.g., cellular networks, VoIP networks, and so on. Here, the communication component 1110 can also include a suitable cellular transceiver 1111 (e.g., a GSM transceiver) and/or an unlicensed transceiver 1113 (e.g., Wi-Fi, WiMax) for corresponding signal communications. The communication device 1100 can be a device such as a cellular telephone, a PDA with mobile communications capabilities, and messaging-centric devices. The communication component 1110 also facilitates communications reception from terrestrial radio networks (e.g., broadcast), digital satellite radio networks, and Internet-based radio services networks.

The communication device 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The communication device 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the communication device 1100, and updated by downloading data and software.

The communication device 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the communication device 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The communication device 1100 also includes a power source 1124 in the form of batteries and/or an AC power subsystem, which power source 1124 can interface to an external power system or charging equipment (not shown) by a power I/O component 1126.

The communication device 1100 can also include a video component 1130 for processing video content received and, for recording and transmitting video content. For example, the video component 1130 can facilitate the generation, editing and sharing of video quotes. A location tracking component 1132 facilitates geographically locating the communication device 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the communication device 1100 to support SIP protocols and register the subscriber with the SIP registrar server. The applications 1106 can also include a client 1142 that provides at least the capability of discovery, play and store of multimedia content, for example, music.

The communication device 1100, as indicated above related to the communication component 1110, includes an indoor network radio transceiver 1113 (e.g., Wi-Fi transceiver). This function supports the indoor radio link, such as IEEE 802.11, for the dual-mode GSM device (e.g., communication device 1100). The communication device 1100 can accommodate at least satellite radio services through a device (e.g., handset device) that can combine wireless voice and digital radio chipsets into a single device (e.g., single handheld device).

Figure 12:
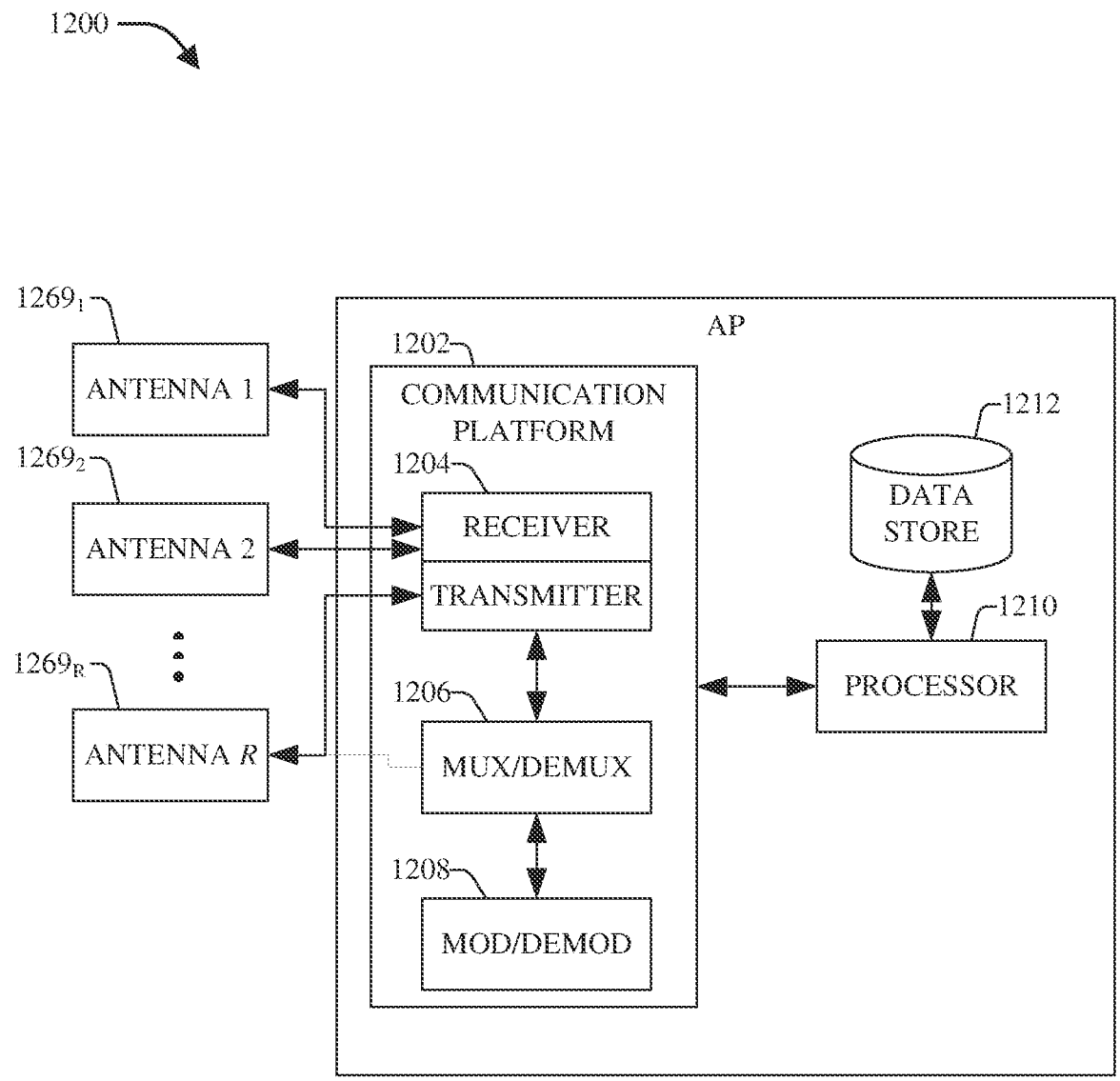
FIG. 12 illustrates a block diagram of an example access point, in accordance with various aspects and embodiments of the disclosed subject matter.

FIG. 12 illustrates a block diagram of an example AP 1200 (e.g., macro base station, femto AP, pico AP, Wi-Fi AP, Wi-Fi-direct AP, . . . ), in accordance with various aspects and embodiments of the disclosed subject matter. The AP 1200 can receive and transmit signal(s) from and to wireless devices like access points (e.g., base stations, femtocells, picocells, . . . ), access terminals (e.g., UEs), wireless ports and routers, and the like, through a set of antennas $1269_1$-$1269_R$. In an aspect, the antennas $1269_1$-$1269_R$ are a part of a communication platform 1202, which comprises electronic components and associated circuitry that can provide for processing and manipulation of received signal(s) and signal(s) to be transmitted. In an aspect, the communication platform 1202 can include a receiver/transmitter 1204 that can convert signal from analog to digital upon reception, and from digital to analog upon transmission. In addition, receiver/transmitter 1204 can divide a single data stream into multiple, parallel data streams, or perform the reciprocal operation.

In an aspect, coupled to receiver/transmitter 1204 can be a multiplexer/demultiplexer (mux/demux) 1206 that can facilitate manipulation of signal in time and frequency space. The mux/demux 1206 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1206 can scramble and spread information (e.g., codes)

according to substantially any code known in the art, e.g., Hadamard-Walsh codes, Baker codes, Kasami codes, polyphase codes, and so on. A modulator/demodulator (mod/demod) 1208 also can be part of the communication platform 1202, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1200 also can comprise a processor(s) 1210 that can be configured to confer and/or facilitate providing functionality, at least partially, to substantially any electronic component in or associated with the AP 1200. For instance, the processor(s) 1210 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 1210 also can facilitate other operations on data, for example, to facilitate implementing or instantiating services (e.g., microservices) for use in connection with communication devices, communicating or forwarding data associated with (e.g., transmitted from or to be received by) communication devices using a connectionless service or connection-oriented service (as applicable), processing data based at least in part on an instantiated service(s), and/or interacting with the service management components or other components of the core network, etc.

In another aspect, the AP 1200 can include a data store 1212 that can store data structures; code instructions; rate coding information; information relating to measurement of radio link quality or reception of information related thereto; information relating to services (e.g., microservices), communication devices (e.g., characteristics and service conditions of or associated with communication devices), subscriptions relating to communication services and microservices, users, service management criteria, traffic flows, signaling, policies, algorithms (e.g., service management algorithm(s), mapping algorithm(s), . . . ), protocols, interfaces, tools, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1210 can be coupled to the data store 1212 in order to store and retrieve information (e.g., information, such as algorithms, relating to multiplexing/demultiplexing or modulation/demodulation; information relating to radio link levels; information relating to establishing communication connections associated with a communication device(s) served by the AP 1200; information relating to implementing or instantiating services (e.g., microservices) for use in connection with communication devices, communicating or forwarding data associated with (e.g., transmitted from or to be received by) communication devices using a connectionless service or connection-oriented service (as applicable), processing data based at least in part on an instantiated service(s), and/or interacting with the service management components or other components of the core network, etc.; . . . ) desired to operate and/or confer functionality to the communication platform 1202 and/or other operational components of AP 1200.

Figure 13:
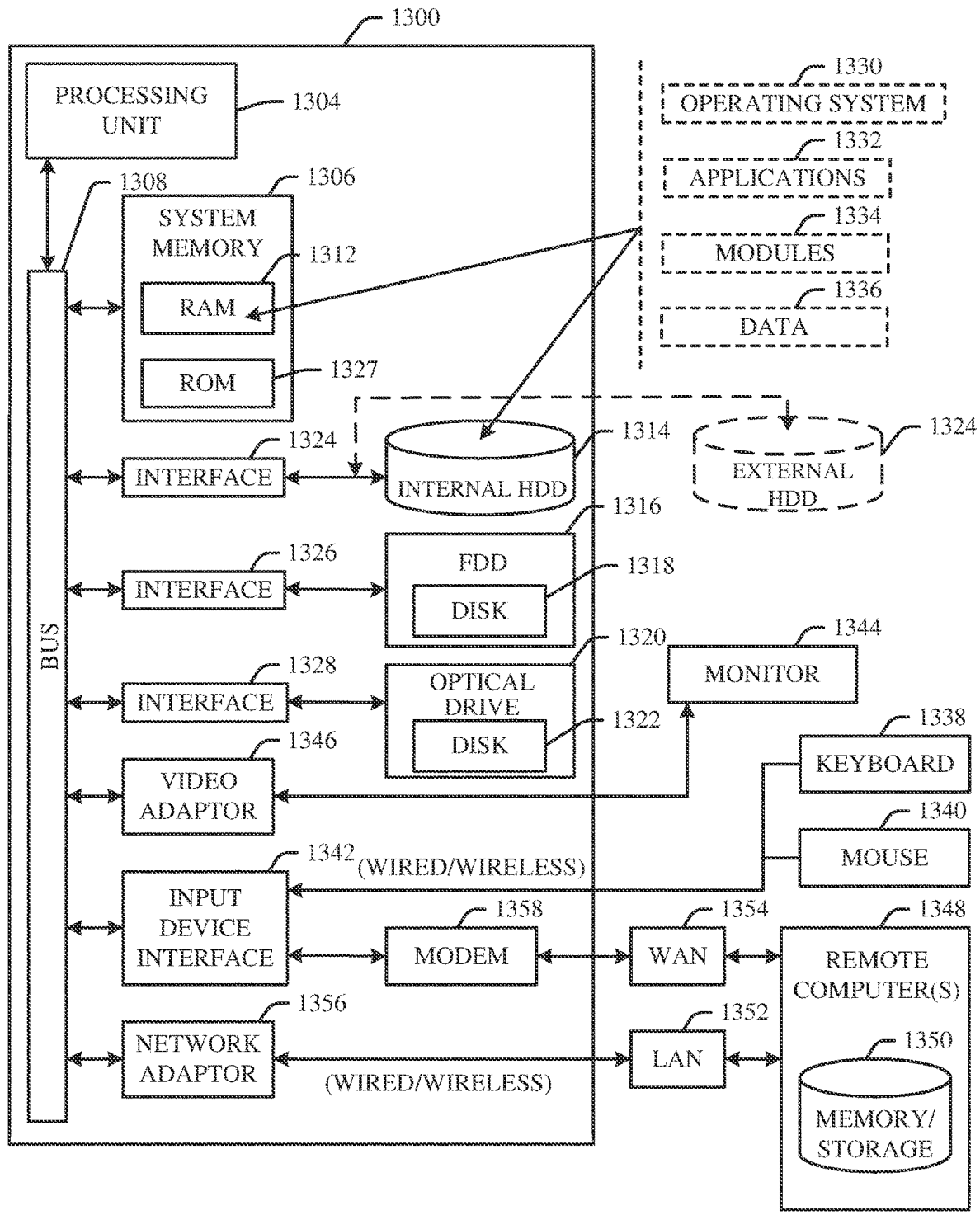
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the disclosed subject matter can be implemented to facilitate managing communication of data received from devices (e.g., IoT devices or other communication devices) associated with a core network, determining characteristics associated with a device or data received from the device, training a device platform (e.g., training a machine learning and/or AI engine of the device platform), and/or performing other operations (e.g., operations of or associated with the device platform). While the description above is in the general context of computer-executable instructions that can run on one or more computers, those skilled in the art will recognize that the disclosed subject also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that can be linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1300 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
with regard to data communicated by a first device and received by first network equipment of a core network, and based on a result of analyzing the data, determining, by a system comprising a processor, characteristics associated with the first device, comprising a device type of the first device, a data communication protocol being utilized for communication of the data by the first device, and a data payload format of the data, wherein the data comprises a data item and metadata, and wherein the data item is part of a data payload formatted in accordance with the data payload format, wherein the data is a first portion of data, and wherein a plurality of portions of data comprises the first portion of data and a second portion of data;
determining, by the system, whether to communicate the data to a second device associated with second network equipment based on a characteristic of the characteristics and a data management criterion; and
controlling, by the system, communication of the plurality of portions of data between the first device and the second device based on the data management criterion, wherein the data management criterion relates to a periodicity of communications associated with the second device, and wherein the periodicity specifies a length of time between permitting a second communication of the second portion of data from the first device to the second device after a first communication of the first portion of data from the first device to the second device is performed.

2. The method of claim 1, wherein the data is associated with a data type, an application, or a service, wherein the result is a first result, and wherein the method further comprises:
determining, by the system, whether the data satisfies a defined threshold value relating to the data type, the application, or the service based on a second result of the analyzing;
in response to determining that the data satisfies the defined threshold value, determining, by the system, that the data is to be communicated to the second device; and initiating, by the system, communication of the data to the second device via the second network equipment, wherein the second network equipment is part of the core network or is part of a communication network associated with the core network.

3. The method of claim 1, wherein the determining of whether to communicate the data to the second device associated with the second network equipment comprises determining whether to communicate the data, a portion of the data, or information determined from the data to the second device associated with the second network equipment based on the characteristic and the data management criterion, and wherein the method further comprises:
based on the data payload format, identifying, by the system, a group of data items that is part of the data payload, wherein the data comprises the group of data items, wherein the group of data items comprises the data item, and wherein the portion of the data comprises at least one data item of the group of data items; and
in response to determining that the data, the portion of the data, or the information determined from the data is to be communicated to the second device based on the characteristic and the data management criterion, communicating, by the system, the data, the portion of the data, or the information to the second device, via the second network equipment, in accordance with the data communication protocol, wherein the second network equipment is part of the core network or is part of a communication network associated with the core network.

4. The method of claim 3, wherein the information comprises a summary of the data, a maximum data value of a data parameter of the data, a minimum data value of the data parameter, an average or median value of the data parameter, a range of data values of the data parameter, a trend in data values of the data parameter, or a standard deviation of the data parameter, over a defined period of time.

5. The method of claim 1, wherein the data payload format is a binary format, a hexadecimal format, a decimal format, a zoned decimal format, an American Standard Code for Information Interchange format, or an extensible markup language format.

6. The method of claim 1, wherein the data communication protocol comprises a hypertext transfer protocol, a secure hypertext transfer protocol, a message queuing telemetry transport protocol, a machine-to-machine connectivity protocol, an advanced message queuing protocol, a lightweight machine-to-machine protocol, a constrained application protocol, a user datagram protocol, a transmission control protocol, an Internet protocol, or a core or communication network-related communication protocol.

7. The method of claim 1, further comprising:
training, by the system, a network function associated with the core network based on an artificial intelligence or a machine learning process, and based on a group of items of information relating to respective device types of respective devices, respective data communication protocols of the respective devices, and respective data payload formats associated with the respective devices, wherein the determining of the device type, the data communication protocol, and the data payload format is facilitated based on the training of the network function.

8. The method of claim 7, wherein the network function is a virtualized network function created in a context of network function virtualization or a software-defined network.

9. The method of claim 7, wherein the determining of the characteristics associated with the first device comprises determining at least one of: the device type of the first device, the data communication protocol being utilized for the communication of the data by the first device, or the data payload format of the data, based on the training of the network function and the result of the analyzing.

10. The method of claim 1, further comprising:
facilitating, by the system, establishment of a packet data protocol context and a packet data network connection between the first device and the first network equipment via a configured access point name associated with the first network equipment; and
routing, by the system, the data from the first device to the first network equipment via third network equipment of the core network based on the packet data protocol context and the packet data network connection, wherein the third network equipment receives the data from the first device and forwards the data to the first network equipment.

11. The method of claim 10, wherein the configured access point name is a first configured access point name, and wherein the method further comprises:
associating, by the system, respective configured access point names with respective gateway devices of the core network, wherein the respective configured access point names comprise the first configured access point name and a second configured access point name, wherein the respective gateway devices comprise the first network equipment and third network equipment, wherein the second configured access point name is associated with the third network equipment,
wherein the first configured access point name and the first network equipment are located in a first location in the core network that is in closer proximity to the first device than a second location in the core network where the second configured access point name and the third network equipment are located, and
wherein, to facilitate reducing latency between first device and the core network, the packet data protocol context and the packet data network connection are established between the first device and the first network equipment via the first configured access point name over the third network equipment via the second configured access point name based on the first location being determined to be in closer proximity to the first device than the second location.

12. A system, comprising:
a processor; and
a memory that stores executable instructions that, when executed by the processor, facilitate performance of operations, the operations comprising:
with regard to information communicated by a user equipment and received by first network equipment of a communication network, and based on a result of analyzing the information, determining attributes associated with the user equipment, comprising a user equipment type of the user equipment, an information communication protocol being utilized for communication of the information by the user equipment, and an information payload format of the information, wherein the information comprises an item of information and metadata, and wherein the item of information is part of an information payload formatted in accordance with the information payload format, wherein the information is a first portion of information, wherein a plurality of portions of information comprises the first portion of information and a second portion of information;

determining whether to communicate the information to a device associated with second network equipment based on an attribute of the attributes and a policy relating to information management; and controlling communication of the plurality of portions of information between the user equipment and the device associated with the second network equipment based on the policy relating to information management, wherein the policy relating to information management relates to a periodicity of the data communications associated with the device associated with the second network equipment, and wherein the periodicity specifies a length of time between permitting a second communication of the second portion of information from the user equipment to the device associated with the second network equipment after a first communication of the first portion of information from the user equipment to the device associated with the second network equipment is performed.

13. The system of claim 12, wherein the information comprises respective items of information that comprise the item of information, wherein the communication network is a first communication network, and wherein the operations further comprise:

receiving the respective items of information from the user equipment; and managing communication of the respective items of information from the first communication network to the device, via the first the network equipment or the second network equipment, based on the policy, to facilitate reducing a first amount of information traffic communicated in, or a second amount of bandwidth utilized by, the first communication network or a second communication network associated with the first communication network, wherein the second network equipment is part of the first communication network or the second communication network.

14. The system of claim 12, wherein the operations further comprise:

identifying a group of items of information, comprising the item of information, that is part of the information payload, based on the information payload format, wherein the information payload format is a binary format, a hexadecimal format, a decimal format, a zoned decimal format, an American Standard Code for Information Interchange format, or an extensible markup language format; and in response to determining that the information, a portion of the information, or data derived from the information is to be communicated to the device based on the policy, communicating the information, the portion of the information, or the data to the device, via the network equipment, in accordance with the information communication protocol, wherein the portion of the information comprises at least one item of information of the group of items of information.

15. The system of claim 12, wherein the operations further comprise:

training a network function that is part of the communication network based on an artificial intelligence or a machine learning technology, and based on a group of items of data relating to respective user equipment types of respective units of user equipment, respective information communication protocols utilized by the respective units of user equipment, and respective information payload formats associated with the respective units of user equipment, wherein the determining of the user equipment type, the information communication protocol, and the information payload format is facilitated based on the training of the network function.

16. The system of claim 12, wherein the information communication protocol comprises a hypertext transfer protocol, a secure hypertext transfer protocol, a message queuing telemetry transport protocol, a machine-to-machine connectivity protocol, an advanced message queuing protocol, a lightweight machine-to-machine protocol, a constrained application protocol, a user datagram protocol, a transmission control protocol, an Internet protocol, or a communication network-related communication protocol.

17. The system of claim 12, wherein the operations further comprise:

in response to determining that the information is not to be communicated to the device based on the attribute and the policy:

discarding the information, or storing the information in a data store associated with the communication network for a defined period of time.

18. A non-transitory machine-readable medium, comprising executable instructions that, when executed by a processor, facilitate performance of operations, the operations comprising:

with regard to data transmitted by a first device and received by a gateway device of a core network, and based on a result of evaluating the data, determining characteristics associated with the first device, comprising a device type of the first device, a data communication protocol being utilized for transmission of the data by the first device, and a data payload format of the data, wherein the data comprises a data item and metadata, and wherein the data item is part of a data payload formatted in accordance with the data payload format, wherein the data is a first portion of data, wherein a plurality of portions of data comprises the first portion of data and a second portion of data;

determining whether to transmit the data to a second device associated with network equipment based on a characteristic of the characteristics and a rule relating to data management; and controlling communication of the plurality of portions of data between the first device and the second device based on the rule relating to data management, wherein the rule relating to data management relates to a periodicity of the communications associated with the second device, and wherein the periodicity specifies a length of time between permitting a second communication of the second portion of data from the first device to the second device based after a first communication of the first portion of data from the first device to the second device is performed.

19. The non-transitory machine-readable medium of claim 18, wherein the determining of whether to transmit the data to the second device associated with the network equipment comprises determining whether to transmit the data, a portion of the data, or information derived from the data to the second device associated with the network equipment based on the characteristic and the rule, wherein the operations further comprise: based on the data payload format, identifying a group of data items that is part of the data payload, wherein the data comprises the group of data items, wherein the group of data items comprises the data item, and wherein the portion of the data comprises at least one data item of the group of data items; and in response to determining that the data, the portion of the data, or the information determined from the data is to be transmitted to the second device based on the characteristic and the rule, transmitting the data, the portion of the data, or the information to the second device, via the network equipment, in accordance with the data communication protocol, wherein the network equipment is part of the core network or is part of a communication network associated with the core network.

20. The system of claim 12, wherein the information payload format is a binary format, a hexadecimal format, a decimal format, a zoned decimal format, an American Standard Code for Information Interchange format, or an extensible markup language format.

\* \* \* \* \*